United States Patent [19]
Sato et al.

[11] Patent Number: 5,256,349
[45] Date of Patent: Oct. 26, 1993

[54] LIGHT WEIGHT FORMED BODY AND METHOD FOR PRODUCING THE SAME

[75] Inventors: Kazuyoshi Sato; Masakazu Hara; Hisaya Kamura, all of Tokyo, Japan

[73] Assignee: NKK Corporation, Tokyo, Japan

[21] Appl. No.: 934,905

[22] Filed: Aug. 26, 1992

Related U.S. Application Data

[63] Continuation of Ser. No. 571,533, filed as PCT/JP89/01337 on Dec. 28, 1989, abandoned.

[30] Foreign Application Priority Data

| Dec. 28, 1988 | [JP] | Japan | 63-329148 |
| Dec. 28, 1988 | [JP] | Japan | 63-329149 |
| Jun. 12, 1989 | [JP] | Japan | 1-146667 |
| Jun. 12, 1989 | [JP] | Japan | 1-146668 |
| Jun. 12, 1989 | [JP] | Japan | 1-146669 |
| Jun. 12, 1989 | [JP] | Japan | 1-146670 |
| Sep. 6, 1989 | [JP] | Japan | 1-231294 |

[51] Int. Cl.$^5$ .......... B28B 1/26; B28B 3/00; B29C 43/02

[52] U.S. Cl. .......... 264/86; 106/711; 106/778; 106/782; 106/789; 106/790; 264/87; 264/571; 264/101; 264/115; 264/122; 264/333

[58] Field of Search .......... 264/333, 86, 87, 122, 264/101, 517, 571, 115; 425/84, 85; 106/712, 778, 782, 785, 789, 790, 711

[56] References Cited

U.S. PATENT DOCUMENTS

| 617,241 | 1/1899 | Elbers | 106/789 |
| 3,951,735 | 4/1976 | Kondo et al. | 106/785 X |
| 3,972,723 | 8/1976 | Ballé et al. | 106/778 X |
| 3,972,972 | 8/1976 | Yano et al. | 106/790 X |
| 4,101,335 | 7/1978 | Barrable | 106/790 X |
| 4,132,555 | 1/1979 | Barrable | 106/790 X |
| 4,146,402 | 3/1979 | Kira et al. | 106/782 X |
| 4,193,958 | 3/1980 | Uchioda et al. | 264/86 |
| 4,310,358 | 1/1982 | Azuma et al. | 106/782 X |
| 4,369,054 | 1/1983 | Shinholster, Jr. et al. | 106/790 X |
| 4,472,201 | 9/1984 | Ochi et al. | 106/789 X |
| 4,545,797 | 10/1985 | Elatter | 106/789 X |
| 4,673,543 | 6/1987 | Akaska et al. | 264/86 X |
| 4,775,505 | 10/1988 | Kuroda et al. | 264/86 X |
| 4,897,119 | 1/1990 | Clarke | 106/790 X |
| 4,964,912 | 10/1990 | Okabayashi et al. | 106/789 X |

FOREIGN PATENT DOCUMENTS

| 3140205 | 4/1983 | Fed. Rep. of Germany . |
| 145837 | 12/1978 | Japan | 264/333 |
| 160428 | 12/1979 | Japan . |
| 51283 | 5/1981 | Japan . |
| 57-7093 | 2/1982 | Japan . |
| 27958 | 2/1982 | Japan . |

OTHER PUBLICATIONS

English translation of the relevant parts of DE-A-3 140 205.

Primary Examiner—Karen Aftergut
Attorney, Agent, or Firm—Sughrue, Mion, Zinn, Macpeak & Seas

[57] ABSTRACT

A light weight formed body used for building materials, heat-insulating materials, furnitures, backing materials and the like, and a method for producing the same. In the light weight formed body and in the manufacturing method thereof, the principal material is a surface-reformed slag of which the reforming involves reforming through the dissolution reaction and the hydration reaction of glass and the reforming through dehydration of the surface-reformed slag above mentioned under heating, and one or more of a polymer dispersion, a reinforcing fiber, a coagulant, a light weight aggregate, a thickener, a dispersing agent, a pigment, a synthetic pulp, a needle- to fiber-shaped calcium silicate hydrate and a hydraulic gypsum are further used together with the above principal material.

22 Claims, 7 Drawing Sheets

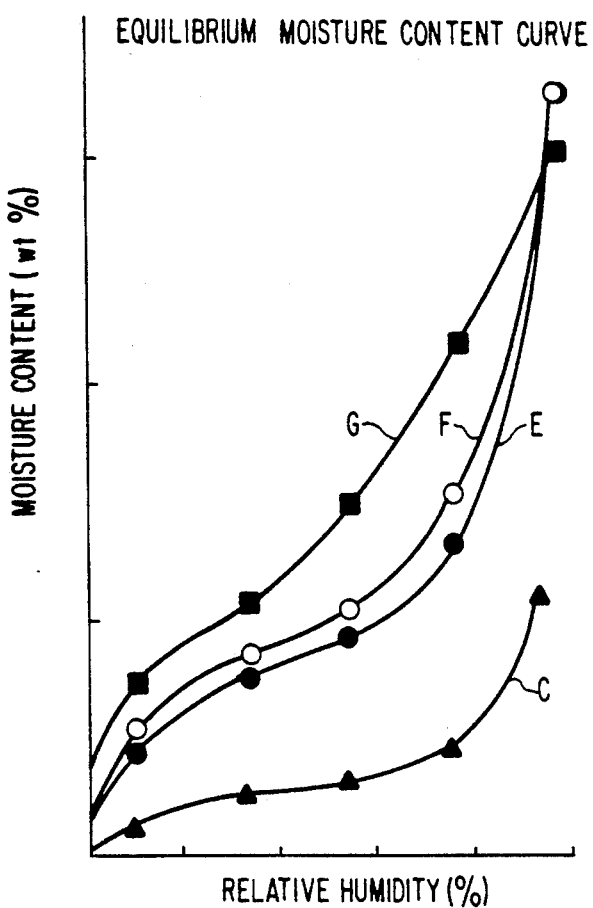
FIG. 5 EQUILIBRIUM MOISTURE CONTENT CURVE
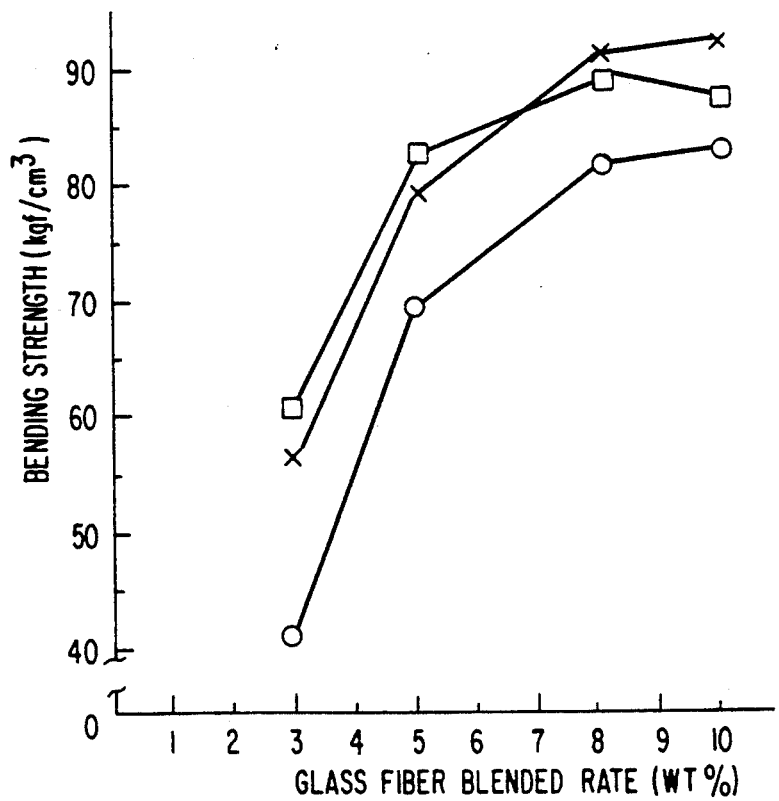
FIG. 6

1 μm

10 μm

LIGHT WEIGHT FORMED BODY AND METHOD FOR PRODUCING THE SAME

This is a continuation of application Ser. No. 07/571,533 filed as PCT/JP89/01337 on Dec. 28, 1989. now abandoned.

TECHNICAL FIELD

This invention relates to a light weight formed body used for building materials, heat-insulating materials, furniture, backing materials and the like, and to producing the same.

BACKGROUND ART

The formed body comprising a calcium silicate as the principal component is called artificial wood or the like, and is widely utilized as a building material. As the manufacturing method, first, water is added to a siliceous raw material and a calcareous raw material to form a slurry mixture, and then gelated by reacting at about 90OC. The gelated material is put in an autoclave, and allowed to react at 190° to 250° C. for several hours to synthesize xonotlite. Class fiber, surfactant, polymer dispersion and the like are optionally added to the xonotlite slurry in order to improve toughness, and mixed with stirring. Then, the slurry is poured in a mold form, and dehydrated by pressing. The pressed matter is dried at about 120° C. to obtain a formed body (Cement and Concrete, No. 469, Mar. 1986, p 37-43).

Xonotlite is a calcium silicate hydrate, and $CaO/SiO_2$ molar ratio is almost 1. The crystal system of xonotlite is, in general, pseudo rhombic lattice (a=17.17 Å, b=3.69 Å, c=6.96 Å, $\beta$=89.6°), and the composition formula is $Ca_6(Si_6O_{17})(OH)_2$. The crystal structure is characterized by having a fiber form of which longitudinal direction extends along the b-axis. The, BET specific surface area of a xonotlite particle is about 25-30 $m^2/g$.

There are various patent applications with respect to calcium silicate formed body, and for example, Japanese Patent KOKAI No. 52-15516 discloses a method comprising mixing a siliceous raw material powder and a calcareous raw material powder in water and allowing to react under heating to obtain an aqueous slurry of calcium silicate, and adding a polymer emulsion thereto to be adsorbed by calcium silicate. Japanese Patent KOKAI No. 54-160428 discloses a method comprising adding hydraulic gypsum, a polymer emulsion and a coagulant for the polymer emulsion to calcium silicate produced from a calcareous raw material and a siliceous raw material through hydrothermal synthesis reaction to form an aqueous slurry, and forming followed by drying to obtain a formed body. Japanese Patent KOKAI No. 60-246251 discloses a method comprising adding a latex of styrene-butadiene copolymer containing carboxyl group and a cation type polymer coagulant to calcium silicate produced from a calcareous raw material and a siliceous raw material through hydrothermal synthetic reaction to form an aqueous slurry, and forming followed by drying to obtain a formed body. Japanese Patent KOKAI No. 63-85038 discloses a method comprising adding water to a mixture of a lime raw material and a silicate raw iiiiteriil to form a slurry, producing a slurry of calcium silicate crystals by heating with stirring in an autoclave, adding synthetic pulp or a thermally denatured one thereof to the slurry, dehydrating and forming followed by drying to obtain a formed body. Japanese Patent KOKAI No. 63-201050 discloses a method comprising mixing a lime stone raw material powder with a siliceous raw material powder, adding water thereto to produce a calcium silicate slurry through hydrothermal reaction, adding sepiolite which adsorbed a polymer emulsion and a reinforcing fiber to the slurry, dehydrating and forming by pressing, and drying to obtain a formed body. Furthermore, Japanese Patent KOKAI No. 63-260847 discloses Lliat in a method comprising adding a latex of styrene-butadiene copolymer containing carboxyl group to calcium silicate hydrate produced from a calcareous raw material and a siliceous raw material through hydrolliermal synthesis reaction to form an aqueous slurry and forniing followed by drying to obtain a formed body, the formed body is reinforced by a fibrous net body.

As mentioned heretofore, in every conventional calcium silicate formed body, calcium silicate such as xonotlile was produced from a calcareous raw material and a siliceous raw material through hydrothermal reaction by heating them at 190-250° C. for several hours under a saturated water vapor pressure. The conventional calcium silicate formed bodies had a problem being expensive because of not only using a highly pure calcareous raw material and siliceous raw material as the raw materials but also consuming a great quantity of energy. Besides, the bending strength of conventional calcium silicate formed bodies was about 80-120 $kgf/cm^2$, and the improvement in the strength was desired. Furthermore, the crystallization water per unit weight of xonotlite was small. Though the heat resistance is high, the xonotlite was poor in the autolysis to release the crystallization water which was also desired to be improved.

DISCLOSURE OF INVENTION

The present invention provides light weight formed bodies which have solved the above problems and methods of producing them. It is characterized by that the principal material is a surface-reformed slag (which means the slag reformed by two kinds of reforming, i.e. the reforming through the dissolution reaction and the hydration reaction of glass and the further reforming through dehydration under heating), and that one or more of a polymer dispersion, a reinforcing fiber, a coagulant, a light weight aggregate, a thickener, a dispersing agent, a pigment, a synthetic pulp, a needle- to fiber-shaped calcium silicate hydrate and a hydraulic gypsum are further used together with the above principal materials.

The surface-reformed slag produced through the dissolution reaction and the hydration reaction of glass is produced by inducing the dissolution reaction and the hydration reaction of glass by treating a glassy blast furnace slag powder with an aqueous solution, and thereby reforming the surface. The form is like a cluster of grapes wherein spheres or almost spherical materials are piled up, different from xonotlite. The main hydration product is tobermorite or an analogous mineral thereof. The glassy blast furnace slag as the raw material may be either a water granulated slag or an air granulated slag or the like. The grain size is preferably fine, and for example, more than 4,000 $cm^2/g$, particularly about 8,000-14,000 $cm^2/g$, in Blaine specific surface area is suitable. In order to obtain the stag having such a grain size, the slag may be pulverized by a grinder and a classifier or the like, if necessary. The specific surface area of the raw slag influences the properties, particularly the bulk specific gravity, of the light weight formed body of the invention. Preferred alkali aqueous solutions are caustic alkali solutions such as caustic soda and caustic potash, and as to the concentration, more than 0.5 N, particularly more than 1N is preferred. In view of practical use, caustic soda is convenient while the use of combined alkali materials is also effective. It is also effective to combine a suitable amount of sodium carbonate with a caustic soda. The treating time is more than 30 minutes, usually about 1 hour to 10 hours, though it is different according to the treating temperature and the like. In order to accelerate reaction, the treating temperature is preferably higher, and about 90° C. in practical viewpoint. Conducting hydrothermal reaction beyond 100° C. is also preferred. Through the alkali treatment, the dissolution reaction and the hydrate formation reaction occur on tile surface of the glassy blast furnace slag particle. As a result, the slag surface is made porous, an(i the BET specific surface area becomes about 20–140 m$^2$/g, preferably more than 40 m$^2$/g, further preferably more than 90 m$^2$/g. The surface-reformed slag particles can be discriminated by the observation through an electron microscope. A photograph of scanning electron microscope of the surface-reformed slag is shown in FIG. 12, and a photograph of scanning electron microscope of a glassy blast furnace slag is shown in FIG. 13, respectively. After the alkali treatment, alkali is removed by washing with water, and then subjected to use. The manufacturing method of such a surface-reformed stag is disclosed in Japanese Patent KOKOKU No. 57-7093 and Japanese Patent KOKAI No. 1-252559, and as to the utilization, an elimination method of phosphorus (Japanese Patent KOKAI Nos. 56-51283, 61-28491, 61-64392), a simultaneous elimination method of arsenic and silicon (Japanese Patent KOKAI No. 62-45394), a dehydration method of a high water content slurry material (Japanese Patent KOKOKU No. 60-26600) and the like are disclosed.

By dehydrating the surface-reformed slag by heating at about 250°–800° C., preferably at about 450° C., for example, the BET specific surface area of 100 m$^2$/g can be raised to about 120–140 m$^2$/g, though it is different according to the initial state. Thus, the effectiveness of the dehydration under heating of hydration-reformed slag was first found by the inventors, and the industrial significance is very great (Japanese Patent KOKAI No. 1-252559). At this time, it is important to select temperature and time conditions so that a sintering phenomenon does not occur by the dehydration under heating. The use of the dehydrated under heating slag is preferred, because the specific strength and the moisture absorption-desorption properties can be improved. In the present specification, the dehydrated under heating slag is also expressed as the surface-reformed slag.

Preferred polymer dispersions adhere to the surface-reformed slag particles uniformly, and various rubber latexes, synthetic resin emulsions and the like are usable.

The rubber latexes are, for example, natural rubber latexes and the latexes of styrene-butadiene copolymer, acrylonitrile-butadiene copolymer, chloroprene polymer and the like, and the synthetic resin emulsions are, for example, the emulsions of ethylene-vinyl acetate copolymer, vinyl acetate polymer, acrylate polymer, vinylidene chloride polymer, vinyl chloride polymer and the like.

A suitable content of the polymer dispersion is about 3–20%, particularly about 5–10%, in the ratio by weight of solid matter to the surface-reformed slag. In the case of less than 3%, the improvement in the strength and the mechanical processibility are insufficient. While, in the case of beyond 20%, the reduction of the fire resistance becomes a problem in practical viewpoint.

The synthetic pulp is produced from a synthetic resin which is made hydrophilic in pulp form, and there are polyethylene pulp, polypropylene pulp, etc. A suitable content is about 3–20%, particularly about 5–10%, in the ratio by weight to the surface-reformed slag. In the case of less than 3%, the improvement in the mechanical processibility and the surface glossiness are insufficient, while in the case of beyond 20%, the fire resistance decreases.

The calcium silicate hydrate can be obtained from a siliceous raw material and a calcareous raw material by adding water to them to induce a hydrothermal reaction. The kind of the calcium silicate hydrate is not restricted. However, needle to fiber crystalline substance such as xonotlite and tobermorite are preferable, and xonotlite is particularly preferable in view of heat resistance and dimensional stability of the formed body.

A suitable blending ratio by weight of the surface-reformed slag to the above calcium silicate hydrate is 9:1 to 1:9, preferably 7:3 to 3:7, and it is suitably selected according to the required properties.

The hydraulic gypsum may be $\alpha$-type or $\beta$-type gypsum hemihydrate, anhydrous gypsum or the like, and a calcined gypsum of which the principal component is $\beta$-type gypsum hemihydrate is preferred. A suitable content of the gypsum is about 10–150%, preferably 30–70%, by weight ratio to the surface-reformed slag. When the content is less than 10%, the improvement effect on the bending strength is small while when the content is beyond 150%, the mechanical processibility and the specific strength decrease. A setting conditioner of gypsum such as sodium citrate may be added, if necessary.

The reinforcing fiber is an inorganic fiber such as glass fiber or carbon fiber, a synthetic fiber, a natural fiber, etc. The synthetic fiber is polyester fiber, polyethylene fiber, etc., and the natural fiber is pulp, cotton, mineral fiber, etc. Among them, glass fiber is particularly preferable in view of incombustibility and cost.

A suitable content of the reinforcing fiber is about 2–10% in the ratio by weight to the surface-reformed slag, though it depends on the specific gravity of the fiber and the like. When the content is less than 2%, the reinforcing effect is not effective in practical viewpoint while when the content is beyond 10%, it is difficult to secure the uniform dispersibility.

By adding a coagulant for the polymer dispersion, the adsorptivity of the polymer dispersion on the surface-reformed slag can be increased, and water-filtering (dehydration) ability in the pressure forming process is improved while the quantity of organic materials leaking in drainage can be reduced, and the drainage treatment can easily be conducted.

As the coagulant, though there are inorganic coagulants such as aluminum sulfate, organic coagulants, particularly cationic polymer coagulants are preferred for the formed body of the invention. As the examples of the cationic polymer coagulants, there are quaternary amine compounds such as polydialkylaminoalkylacrylate, polyaminomethylacrylamide, polyvinylpyridinium halide and polyvinylimidazoline, and the like.

A preferable content of the coagulant is, in the case of a cationic polymer coagulant, about 0.05-0.2 part by weight against 1 part by weight (solid matter weight) of the polymer dispersion.

A light weight aggregate can be added to the light weight formed body. The light weight aggregate is perlite, sirasu balloon or the like. The content beyond 60% by weight ratio to the surface-reformed slag is not preferable because the strength, the processability and the like decrease.

A thickener may be added to the light weight formed body in order to secure the improvement in the dispersibility of the reinforcing fiber, the formability at forming and the like. As the thickener, water-soluble polymers, in general, cellulose ethers are used.

A dispersing agent may be added to the light weight formed body in order to improve the dispersion of the polymer, the reinforcing fiber and the like, the fluidity of kneading slurry and the like. As the dispersing agent, naphthalene sulfonate-formalin high condensates, melamine sulfonic acid compounds and the like are used.

The light weight formed body may be colored by adding various pigments. Examples of the pigments are inorganic pigments such as lead white, red lead, chrome yellow, ultramarine, Berlin blue, cobalt oxide, titanium dioxide, titanium yellow, iron oxide red, iron oxide black, molybdate orange, litharge and aluminum powder and organic pigments such as azo pigments and phthalocyanine pigments.

The light weight formed body may contain other additives within the extent not to impair the characteristics. The additives are suitably selected from known additives for calcium silicate formed bodies.

As the manufacturing method of the light weight formed body, it is enough that a mixture containing a surface-reformed slag powder (or a slurry containing it), hydraulic gypsum, a polymer dispersion, etc. and water is kneaded, and formed followed by drying. In the case of adding the reinforcing fiber, the coagulant, the synthetic pulp, the calcium silicate hydrate, the light weighs aggregate, the thickener, the dispersing agent, the pigment, etc., they are added before or during kneading. Water for kneading may be in a form of a suspension or aqueous solution of one or more of the above components. Besides, the surface-reformed slag or calcium silicate hydrate washed with water is used without drying, and the water content may be utilized for kneading.

When there is the possibility that defects occur in the formed body by the contamination of the kneaded slurry with bubbles, an antifoaming agent may be added to the slurry or the slurry may be defoamed under reduced pressure during or after kneading.

The forming method may be selected from pressing, paper making, extruding, pressure reducing and the like according to the object and use of the final product, however, a common method is composed of pressing a slurry produced by kneading to form it by dehydration. In this case, the slurry is, in general, poured into a mold such as a mold form and pressed. In order to improve uniform dehydration and forming efficiency, wire gauze, filter paper, filter cloth, porous plate or the like may be used for the pressing face, an unit capable of dehydration and defoaming under reduced pressure may be incorporated, or an embossed plate may be incorporated in order to improve the design of the surface. Moreover, after dehydration by pressing, the formed body may be cut into a prescribed form. The pressing may be conducted at a pressure capable of dehydrating up to a prescribed degree, for example, it is adjusted so that the bulk specific gravity of the formed body becomes a prescribed body, and it is usually 10-100 kg /cm$^2$, preferably 20-60 kgf/cm$^2$.

While, it should be noted that the technical point varies according Lo the selected forming method, such as, in the extrusion forming, the optimum water content is different from that in tile pressing forming, and in the forming through the paper making process, a devise is necessary for the stable incorporation (fixing) of an additive such as the polymer dispersion into the formed body.

A preferable degree of the drying is to remove the water content in the formed body and to allow the crystallization water of the surface-reformed slag to remain, and for example, the drying may be conducted under heating at about 100°-180° C., preferably at about 110°-150° C. In order to prevent cracking by drying of the formed body, to conduct predrying at about 60°-80° C. is also preferred.

The light weight formed body of the invention has the composition of the kneaded matter from which water is eliminated, and it is a porous body having a bulk specific gravity of about 0.2-1 g/cm$^3$, preferably about 0.4-0.6 g/cm$^3$.

In the light weight formed body of the invention, the complex texture of which the principal component is the surface-reformed slag in a spherical form to a grape cluster form has heat resistance, heat-insulating property, moisture-controlling property and the like, and it is the principal component of the light weight formed body. The reformed slag has a good physical adsorptivity and has an action to facilitate coloring by various pigments or the like. Gypsum hydrate (gypsum dehydrate) raises strength such as bending strength of the light weight formed body without reducing the incombustibility. The polymer dispersion adheres onto the surface of the surface-reformed slag particles to bind the particles, and improves toughness, processibility such as cutting, scraping and nailing, bending strength, tensile strength and the like. The synthetic pulp not only imparts mechanical processibility such as cutting, scraping and nailing to the formed body, but also improves surface glossiness and further water filterability (dehydration ability). The calcium silicate hydrate improves heat resistance, dimensional stability and the like. The reinforcing fiber raises strength such as rupture strength. The coagulant raises the fixation ability of the polymer dispersion to the surface-reformed slag, and improves water filterability (dehydration ability) in the press forming process. The light weight aggregate raises heat-insulating ability, as well as makes the formed body lighter. The thickener improves the dispersion of the reinforcing fiber. The dispersing agent improves the dispersion of the polymer, the reinforcing fiber and the like. The pigment colors the light weight formed body.

BRIEF DESCRIPTION OF DRAWINGS

FIG. 5 is a graph illustrating equilibrium moisture content curves of products of the invention and conventional products.

FIG. 6 is a graph illustrating the relation between the content of glass fibers and the bending strength.

BEST MODE FOR CARRYING OUT THE INVENTION

Figure 1:
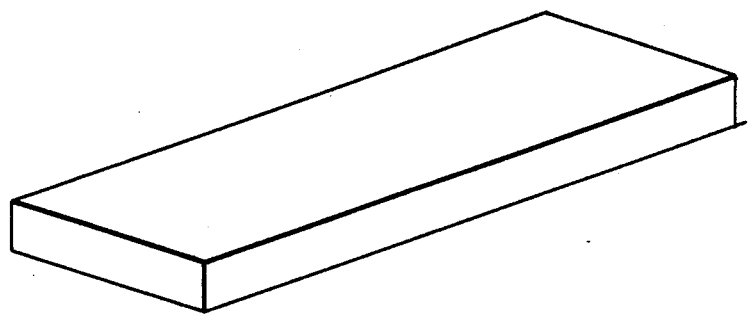
FIG. 1 is a perspective view of a light weight formed body being an embodiment of the invention.

Examples of the invention are shown below.

The properties of the light weight formed body in the examples were measured according to the following methods.

Bulk specific gravity: The weight and size of the formed body was measured, and it was determined by calculation.

Bending strength: According to JIS A 1106-1976. The size of the test piece was 40 mm × 160 mm × 25 mm.

Processibility: Evaluated in 3 ranks of ◯, Δ, X from good ones in view of cuttability by a saw, scraping ability by a plane, nailing ability, etc.

Combustibility: According to JIS A 1321-1975. The size of the test piece was 40 mm × 40 mm × 50 mm, and the heating time was 30 seconds.

Moisture absorption-desorption property: Moisture absorption property was determined by allowing to stand in a thermohydgrostat at 20° C. at 50% relative humidity for more than 72 hours, confirming that it is a constant weight, changing the humidity to 90% relative humidity, and measuring the increase in weight. Moisture desorption was determined similarly by rendering a constant weight at 90% relative humidity, changing to 50%, and measuring the decrease in weight.

Resistance to wounding: Abrasion test (sand dropping method) for building material and building construction portion was conducted according to JIS A 1452-1972 A and C, and this property was evaluated by the degree of loss of the surface glossiness and the degree of loss of the surface layer through observation in 3 ranks of ◉, ◯, X from good ones.

Particle size distribution of ground dust: Determined by sieving using standard sieves and measuring the weight.

Specular gloss of polished face: Conducted according to JIS Z 8741-1962.

Dimensional stability: A test piece of 40 mm in breadth × 160 mm in length × 25 mm in height was allowed to stand in a thermohygrostat at 200° C. at 65% relative humidity until reaching a constant weight. Then, it was dried at 110° C. for 24 hours, and the variation rate from the original length was measured, while the test piece was immersed in water at 200° C. for 24 hours, and the variation rate was measured similarly. In examples, the dimensional stability was expressed in the following variation rate in length.

Variation rate in length:

$$\text{Variation rate in length} = \frac{l_1 - l_2}{l_1} \times 100\ (\%)$$

$l_1$: Basic length at 20° C., at 65% RH
$l_2$: Length after drying or water absorption Water filterability: Evaluated by the time taken for pressing to dehydrate a slurry adjusted so that the bulk specific gravity became 0.5 (containing a fixed quantity of solid matter) up to a fixed thickness to form it.

EXAMPLES 1–4

Glassy blast furnace slag (blast furnace water granulated slag, manufactured by Keihin Works, NKK Corporation) was ground up to a Blaine specific surface area of 4,500 cm²/g by a ball mill, and classified as the raw material for classification by an air classifier to obtain a pulverized slag having a Blaine specific surface area of 14,000 cm²/g.

The pulverized slag was added to NaOH solution 3 normal in concentration at a temperature of 90° C. at a rate of 5 g per 100 ml thereof, and treated with stirring for 3 hours to obtain the surface-reformed slag of a BET specific surface area of 100 m²/g. The surface-reformed slag was sufficiently washed with water to remove alkali materials and dried, and used is the raw material for producing the formed body.

To 100 parts by weight of the surface-reformed slag, each 5, 10, 20, 30 parts by weight (as the solid matter) of a polymer dispersion (styrene-butadiene copolymer latex, Nipol LX-438C, manufactured by Nippon Zeon Co., Ltd.) and water were added, and then kneaded. The slurry was poured in a mold form, and formed with gradual dehydration by pressing. This was dried at 60° C. for 15 hours and then at 110° C. for 5 hours to obtain the light weight formed bodies shown in FIG. 1.

COMPARATIVE EXAMPLE 1

An amorphous silicic acid and hydrated lime were blended so that the molar ratio of $SiO_2:CaO$ was 1:1, and 5 times in quantity of water was added. The mixture was allowed to react at 90° C. for 3 hours, and C—S—H gel (C:CaO, S:$SiO_2$, H:$H_2O$) was first obtained.

Subsequently, 3 times in quantity of water was added to the slurry, and allowed to react in an autoclave under the conditions of 209° C. and 19 kgf/cm²G for 3 hours with stirring to produce calcium silicate hydrate. The produced hydrate was confirmed to be xonotlite by powder X-ray diffraction. To 100 parts by weight of the xonotlite powder, 10 parts by weight of the same polymer dispersion as Example 1 (styrene-butadiene copolymer latex) and water were added, and formed in a similar method to Examples 1–4 to produce a light weight formed body.

Figure 2:
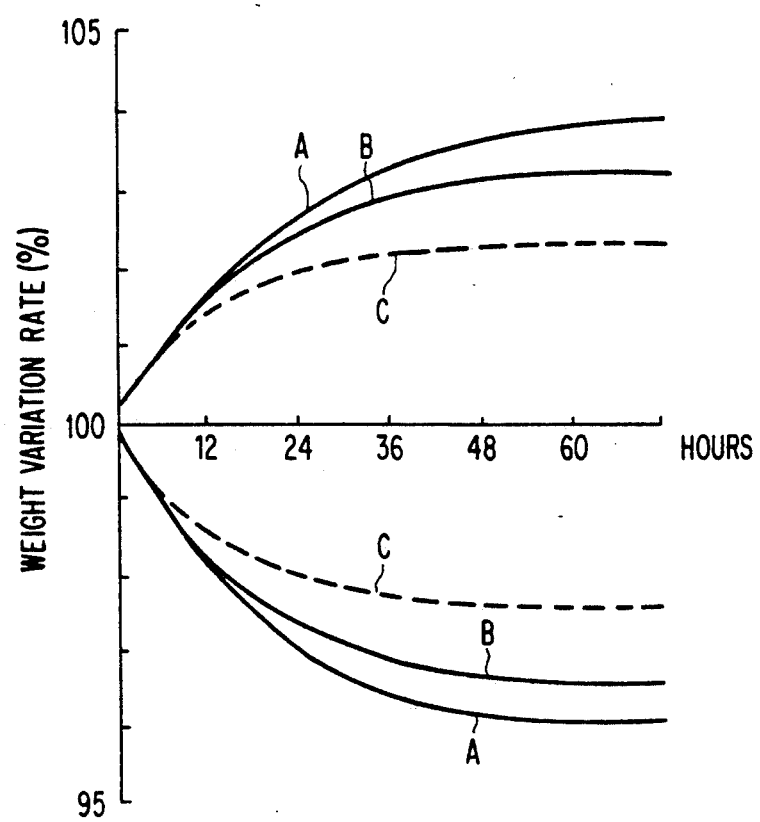
FIG. 2 is a graph illustrating curves showing moisture absorption-desorption properties as to products of the invention and a conventional product.

The properties examination results are shown in Table 1 and FIG. 2.

TABLE 1

|  | Example 1 | Example 2 | Example 3 | Example 4 | Comparative 1 |
|---|---|---|---|---|---|
| Composition (wt. Part) | | | | | |
| Surface-Reformed Slag | 100 | 100 | 100 | 100 | 0 |
| Calcium Silicate Hydrate (Xonotlite) | 0 | 0 | 0 | 0 | 100 |
| Polymer Dispersion (Styrene-Butadiene Copolymer Latex) | 5 | 10 | 20 | 30 | 10 |
| Properties | | | | | |
| Bulk Specific Gravity (g/cm$^3$) | 0.50 | 0.50 | 0.50 | 0.50 | 0.50 |
| Bending Strength (kgf/cm$^2$) | 11 | 21 | 30 | 41 | 16 |
| Processability | Δ | ○ | ○ | ○ | ○ |
| Combustibility | in-combustible | in-combustible | in-combustible | combustible | in-combustible |

The measured results of the moisture absorption-desorption properties of the light weight formed body of Example 2 (B) and the light weight formed body of Comparative Example 1 (C) are shown in FIG. 2. The moisture absorption curve was obtained by measuring the weight variation with time when RH was elevated from 50% to 90% at 20° C., and the moisture desorption curve was obtained by measuring the weight variation with time when RH was lowered from 90% to 50% at 20° C. conversely.

Table 1 and FIG. 2 show that the formed body using the surface-reformed slag is excellent in strength and moisture absorption-desorption properties compared with the formed body using xonotlite.

EXAMPLES 5-8

The surface-reformed slag having a BET specific surface area of 100 m$^2$/g prepared in Examples 1-4 was dehydrated under heating at 450° C. for 4 hours to obtain the surface-reformed slag of which the BET specific surface area was improved up to 120 m$^2$/g.

To 100 parts by weight of the above surface-reformed slag of 120 m$^2$/g, each 5, 10, 20, 30 parts by weight (as the solid matter) of the same polymer dispersion as Examples 1-4 and water were added, and then kneaded to obtain the light weight formed bodies similar to Examples 1-4.

The properties examination results of the light weight formed bodies are shown in Table 2.

The results of the moisture absorption-desorption properties of the light weight formed body of Example 6 (A) measured similar to the light weight formed body of Example 2 is also shown in FIG. 2.

Table 2 and FIG. 2 show that the formed body using the surface-reformed slag is excellent in specific strength (strength/specific gravity), and moisture absorption-desorption properties compared with the formed body using xonotlite.

EXAMPLE 9

The light weight formed body was produced similar to Example 2 except that an aqueous suspension of 5 parts by weight of glass fiber (chopped strand of E glass, 13 mm in length, manufactured by Nitto Boseki Co., Ltd.) was added.

COMPARATIVE EXAMPLE 2

A light weight formed was produced similar to Comparative Example 1, except that the same aqueous suspension of 5 parts by weight of the glass fiber as Example 9 was added.

The properties examination results of both light weight formed bodies are shown in Table 3.

TABLE 3

|  | Example 9 | Comparative Example 2 |
|---|---|---|
| Composition (wt. Part) | | |
| Surface-Reformed Slag | 100 | 0 |

TABLE 2

|  | Example 5 | Example 6 | Example 7 | Example 8 | Comparative 1 |
|---|---|---|---|---|---|
| Composition (wt. Part) | | | | | |
| Surface-Reformed Slag | 100 | 100 | 100 | 100 | 0 |
| Calcium Silicate Hydrate (Xonotlite) | 0 | 0 | 0 | 0 | 100 |
| Polymer Dispersion (Styrene-Butadiene Copolymer Latex) | 5 | 10 | 20 | 30 | 10 |
| Properties | | | | | |
| Bulk Specific Gravity (g/cm$^3$) | 0.47 | 0.47 | 0.47 | 0.47 | 0.50 |
| Bending Strength (kgf/cm$^2$) | 13 | 20 | 32 | 40 | 16 |
| Processability | Δ | ○ | ○ | ○ | ○ |
| Combustibility | in-combustible | in-combustible | in-combustible | combustible | in-combustible |

TABLE 3-continued

|  | Example 9 | Comparative Example 2 |
| --- | --- | --- |
| Calcium Silicate Hydrate (Xonotlite) | 0 | 100 |
| Polymer Dispersion (SBR) | 10 | 10 |
| Glass Fiber | 5 | 5 |
| Properties |  |  |
| Bulk Specific Gravity (g/cm$^3$) | 0.50 | 0.50 |
| Bending Strength (kgf/cm$^2$) | 82 | 69 |
| Processibility | ◯ | ◯ |
| Combustibility | incombustible | incombustible |

The examination results show that in the reinforcing fiber blended group, the formed body using the surface-reformed slag is excellent in strength properties compared with the formed boy using xonotlite.

EXAMPLE 10

1 part by weight (0.1 part by weight to 1 part by weight of the polymer dispersion) of a cationic coagulant (SUNFLOC C454, manufactured by Sanyo Chemical Ind. Ltd.) was added to the blend of Example 9, and the contaminated state of drainage with the polymer was compared with Example 9 through forming by press dehydrating.

A small quantity of the polymer contamination was observed in the drainage in Example 9 (no coagulant was added), whereas it was not observed in Example 10 (a coagulant was added).

Thus, by using a coagulant, water filterability (dehydration ability) could be improved through forming, and the drainage treatment could be facilitated.

EXAMPLES 11–13

Each 10, 30, 60 parts by weight of a light weight aggregate (shirasu balloon, bulk density: 0.24, manufactured by Sanki Kogyo K.K.) was added to the blend of Example 10, and the light weight formed bodies were produced similarly.

The properties examination results of the produced formed bodies are shown in Table 4.

TABLE 4

|  | Example 10 | Example 11 | Example 12 | Example 13 |
| --- | --- | --- | --- | --- |
| Composition (wt. part) |  |  |  |  |
| Surface-Reformed Slag | 100 | 100 | 100 | 100 |
| Polymer Dispersion (SBR) | 10 | 10 | 10 | 10 |
| Glass Fiber | 5 | 5 | 5 | 5 |
| Coagulant | 1 | 1 | 1 | 1 |
| Light Weight Aggregate (Shirasu Balloon) | 0 | 10 | 30 | 60 |
| Properties |  |  |  |  |
| Bulk Specific Gravity (g/cm$^3$) | 0.50 | 0.48 | 0.45 | 0.41 |
| Bending Strength (kgf/cm$^2$) | 80 | 80 | 67 | 52 |
| Processibility | ◯ | ◯ | ◯ | △ |
| Combustibility | incombustible | incombustible | incombustible | incombustible |

The examination results show that to make the formed body lighter is possible by blending a light weight aggregate.

EXAMPLE 14

On the basis of the blend of Example 10, a coloring test of the formed body by pigments was conducted. The pigments used were 4 kinds (all manufactured by Dainichi Seika, K.K.), i.e. yellow (Ti-Sb-Ni), brown (Fe-Zn), green (Ti-Zn-Ni-Co) and blue (Co-Al-Zn), of dipyroxide color.

The surface-reformed slag has a good adsorptivity, and color unevenness did not occur and uniform coloring was possible.

EXAMPLE 15

To 100 parts by weight of the surface-reformed slag of 120 m$^2$/g produced in Examples 5–8, the same aqueous suspension as Example 10 of 10 parts by weight of the polymer dispersion, 5 parts by weight of the glass fiber and 1 part by weight of the cationic coagulant was added, and then kneaded.

The light weight formed body was produced from the above slurry similar to Example 10.

Figure 3:
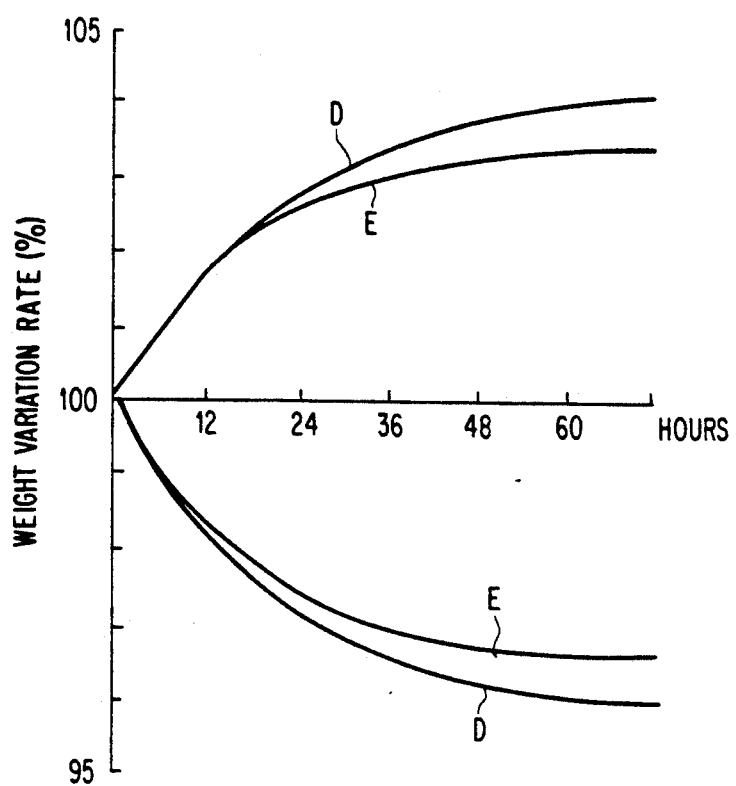
FIG. 3 is a graph illustrating similar curves as to the formed bodies using two kinds of the surface-reformed slags, respectively.

The properties examination results of the light weight formed body are shown in Table 5 and FIG. 3 together with the results of Example 10 using tile surface-reformed slag of 100 m$^2$/g as a comparative example.

TABLE 5

|  | Example 15 | Comparative Example (Example 10) |
| --- | --- | --- |
| Composition (wt. Part) |  |  |
| Surface-Reformed Slag (120 m$^2$/g) | 100 | 0 |
| Surface-Reformed Slag (100 m$^2$/g) | 0 | 100 |
| Polymer Dispersion (SBR) | 10 | 10 |
| Glass Fiber | 5 | 5 |
| Light Weight Aggregate (Shirasu Balloon) | 1 | 1 |
| Properties |  |  |
| Bulk Specific Gravity (g/cm$^3$) | 0.47 | 0.50 |
| Bending Strength (kgf/cm$^2$) | 81 | 80 |
| Processibility | ◯ | ◯ |
| Combustibility | incombustible | incombustible |

The measured results of the moisture absorption-desorption properties of the light weight formed body of this Example (D) and that of Example 10 (E) are shown in FIG. 3. The moisture absorption curve was obtained by measuring the weight variation with time when RH was elevated from 50% to 90% at 20° C., and the moisture desorption curve was obtained by measuring the weight variation with time when 1111 was lowered from 90% to 50% at 20° C. conversely.

The results of Table 5 and FIG. 3 show that the improvement in the specific strength (strength/specific gravity) and in the moisture absorption-desorption properties is possible by using the surface-reformed slag of 120 m$^2$/g.

EXAMPLE 16

Glassy blast furnace slag was ground up to a Blaine specific surface area of 4,500 cm$^2$/g by a ball mill, and classified as the raw material for classification by an air classifier to obtain a pulverized slag having a Blaine specific surface area of 8,000, 14,000 cm$^2$/g.

The slag powder of 4,500, 8,000, 14,000 cm$^2$/g was used as the raw material, and added to NaOH solution 3 normal in concentration at a temperature of 90° C. at a rate of 5 g per 100 ml thereof, and treated with stirring for 3 hours to obtain the surface-reformed slag.

These surface-reformed slags were sufficiently washed with water to remove alkali materials, and dried to obtain powder materials.

The BET specific surface areas by the $N_2$ adsorption method of the surface-reformed slags were 55, 96, 103 $m^2/g$ for the Blaine specific surface area of 4,500, 8,000, 14,000 $cm^2/g$, respectively.

Subsequently, bulk specific gravities of the slag powders of the Blaine specific surface area of 4,500, 8,000, 14,000 $cm^2/g$ and tile surface-reformed slags produced using them as the raw material were measured. The bulk specific gravities measured were the tapping bulk density determined by using a powder properties measuring device manufactured by Tsutsui Rikagaku Kikai K. K.

The light weight formed bodies were produced using the above surface-reformed slags as the raw material, and the influence of the kind of the raw material upon the bulk specific gravity of the formed body noted. As the manufacture of the light weight formed body, to 100 parts by weight of the surface-reformed slag, 10 parts by weight (as the solid matter) of a polymer dispersion (styrene-butadiene copolymer latex, Nipol LX-438C, manufactured by Nippon Zeon Co., Ltd.) 3 parts by weight of glass fiber (E glass chopped strand, MICRO-GLASS RES06, manufactured by Nippon Sheet Glass Co., Ltd.) and 300 parts by weight of water were added, and then, kneaded. Furthermore, 1 part by weight of a coagulant (SUNFLOC C-450, manufactured by Sanyo Chemical Ind. Ltd.) was added and kneaded to obtain a slurry where these raw materials were uniformly dispersed. The slurry was poured into a mold form, and formed with gradual dehydration by pressing. The final forming pressure of each surface-reformed slag was fixed to 60 $kgf/cm^2$. The formed bodies were dried at 60° C. for 18 hours and then at 110° C. for 6 hours to obtain tile light weight formed bodies.

Figure 4:
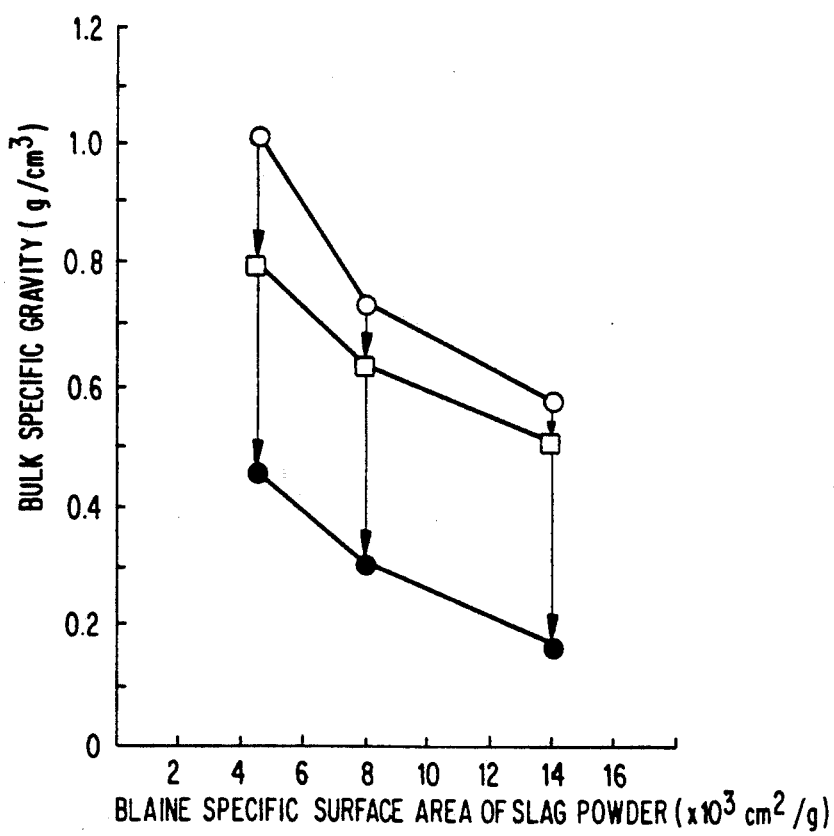
FIG. 4 is a graph showing the relation between the Blaine specific surface area and the bulk specific gravity of a slag powder.

The measured results of the bulk specific gravity of the slag powders, the surface-reformed slags and the formed bodies are shown in FIG. 4. In the figure, the open circles indicate tile slag powders, the closed circles indicate the surface-reformed slags, and the squares indicate the light weight formed bodies, respectively. The arrows in the figure indicate the corresponding relation. The results of FIG. 4 show that the bulk specific gravity of the formed body is influenced by the Blaine specific surface area of slag powder, and when the Blaine specific surface area is greater, tile bulk specific gravity of the formed body is smaller.

EXAMPLE 17

0.3 part by weight of a cellulose ether thickener (HI-METHOLOSE, manufactured by Sinetsu Chemical Co., Ltd.) was added to tile blend of Example 10, and the formed body was produced in a similar method to Example 10. The properties of the formed body is shown in Table 6.

TABLE 6

| | Example |
|---|---|
| Composition (wt. Part) | |
| Surface-Reformed Slag | 100 |
| Polymer Dispersion SBR | 10 |
| Glass Fiber | 5 |
| Coagulant | 1 |
| Thickener | 0.3 |

TABLE 6-continued

| | Example |
|---|---|
| Properties | |
| Bulk Specific Gravity (g/cm$^3$) | 0.5 |
| Bending Strength (kgf/cm$^2$) | 90 |
| Processibility | ○ |
| Combustibility | incombustible |

Thus, the formed body having a high bending strength is obtained by adding a thickener.

EXAMPLE 18

Melamine sulfonate-formalin condensate (NL-4000, manufactured by Bozorisu Bussan K.K.) was added to the blend of Example 10 as a dispersing agent, and the formed body was produced in a similar method.

The properties of the produced formed body are shown in Table 7.

TABLE 7

| | Example |
|---|---|
| Composition (wt. Part) | |
| Surface-Reformed Slag | 100 |
| Polymer Dispersion SBR | 10 |
| Glass Fiber | 5 |
| Coagulant | 1 |
| dispersing Agent | 0.5 |
| Properties | |
| Bulk Specific Gravity (g/cm$^3$) | 0.50 |
| Bending Strength (kgf/cm$^2$) | 89 |
| Processibility | ○ |
| Combustibility | incombustible |

Thus, the formed body having a high bending strength is obtained by using a dispersing agent.

EXAMPLE 19

Glassy blast furnace slag was ground up to a Blaine specific surface area of 4,680 $cm^2/g$ by a roller mill, and classified by an air classifier to obtain a pulverized slag having a Blaine specific surface area of 14,100 $cm^2/g$.

This was allowed to react in a mixed solution of 8 parts by weight of NaOH aqueous solution (Concentration: 3M) and 2 parts by weight of KOH aqueous solution (Concentration: 311) to obtain the surface-reformed slag having a BET specific surface area of 140 $m^2/g$.

The above surface-reformed slag was substituted for the surface-reformed slag having a BET specific surface area of 100 $m^2/g$ in Example 10, and the formed body was produced in a similar method. In order to investigate the moisture absorption-desorption properties of the produced formed body (F), the equilibrium moisture content was measured. The measurement was also conducted in a similar method as to the formed body of Example 10 (E), the formed body of Comparative Example 1 (C) and a natural wood of Japanese cypress (G).

The measurement of the equilibrium moisture content was conducted according to the method shown below.
① The sample size was a 3 cm cube.
② The temperature in the hygrostat was 20±0.5° C.
③ The humidity in each hygrostat was kept in 5 levels shown in Table 8 by salt saturated aqueous solutions in the coexisting state of crystals.
④ The sample was dried at 105° C.±2° C. up to the constant weight, and the absolute dry weight was measured.

⑤ The sample was first placed in the hygrostat of level 1, and it was confirmed that the sample became a constant weight. Then, the sample was transferred to level 2, 3, 4, 5 successively, and respective moisture contents were calculated by the following formula.

$$\text{Moisture Content} = \frac{\text{Weight at Constant Weight} - \text{Absolute Dry Weight}}{\text{Absolute Dry Weight}} \times 100 \ (\text{wt. \%})$$

TABLE 8

| Level | Salt | Relative Humidity (at 20° C.) |
|---|---|---|
| 1 | $ZnCl_2 \ XH_2O$ | 10.0% |
| 2 | $MgCl_2 \ 6H_2O$ | 33.1% |
| 3 | $Ca(NO_3)_2 \ 4H_2O$ | 53.6% |
| 4 | NaCl | 75.1% |
| 5 | $KNO_3$ | 93.1% |

Equilibrium moisture content curves are shown in FIG. 5. Thus, it is apparent that the formed bodies of the examples have excellent moisture absorption-desorption properties.

EXAMPLES 20, 21

In the blend of Example 10, an acrylic-modified epoxy resin (ARMATEX, manufactured by Mitsui Toatsu Chemicals Inc.) was blended instead of SBR as the polymer dispersion, and the formed body was produced in a similar method. The properties of the obtained formed body are shown in Table 9.

TABLE 9

| | Example 20 | Comparative Example 21 |
|---|---|---|
| Composition (wt. Part) | | |
| Surface-Reformed Slag | 100 | 0 |
| Polymer Dispersion (Acrylic-Modified Epoxy) | 10 | 20 |
| Glass Fiber | 5 | 5 |
| Coagulant | 1 | 2 |
| Properties | | |
| Bulk Specific Gravity (g/cm³) | 0.50 | 0.48 |
| Bending Strength (kgf/cm²) | 78 | 90 |
| Processibility | △ | ○ |
| Resistance to Wounding | ○ | ⊚ |
| Combustibility | incombustible | incombustibility |

Thus, by using an acrylic-modified epoxy, the formed body produced has a good resistance to wounding and is excellent in incombustibility.

EXAMPLE 22

In the blend of Example 10, 2 kinds of SBR and an acrylic-modified epoxy resin (ARMATEX, manufactured by Mitsui Toatsu Chemicals Inc.) were blended instead of SBR as the polymer dispersion, and the formed body was produced in a similar method. The properties of the obtained formed body are shown in Table 10.

TABLE 10

| | Example |
|---|---|
| Composition (wt. Part) | |
| Surface-Reformed Slag | 100 |
| Polymer Dispersion (SBR) | 5 |
| Polymer Dispersion (Acrylic-Modified Epoxy) | 5 |
| Glass Fiber | 5 |
| Coagulant | 1 |
| Properties | |
| Bulk Specific Gravity (g/cm³) | 0.49 |
| Bending Strength (kgf/cm²) | 95 |
| Processibility | ○ |
| Combustibility | incombustible |

Thus, the formed body having a high bending strength is obtained by combining SBR and an acrylic-modified epoxy.

EXAMPLE 23

On the basis of the blend of Example 10, glass fibers having a fiber length of 6, 13, 25 mm were used, and the blending quantity was changed to 3, 5, 8, 10 parts by weight. The formed bodies were produced in a similar method to Example 10.

The properties of tile obtained formed bodies are shown in FIG. 6. In the figure, the open circles indicate the fiber length of 6 mail, X indicate the fiber length of 13 mm, and the squares indicate the fiber length of 25 mm.

EXAMPLE 24

In the blend of Example 10, 3 parts by weight of pitch carbon fiber (manufactured by Kureha Chemical Ind. Co., Ltd.) were blended instead of 5 parts by weight of glass fiber, and the formed body was produced in a similar method. The properties of the produced formed body are shown in Table 11.

TABLE 11

| | Example |
|---|---|
| Composition (wt. Part) | |
| Surface-Reformed Slag | 100 |
| Polymer Dispersion (SBR) | 10 |
| Carbon Fibier | 3 |
| Coagulant | 1 |
| Properties | |
| Bulk Specific Gravity (g/cm³) | 0.48 |
| Bending Strength (kgf/cm²) | 115 |
| Processibility | ○ |
| Combustibility | incombustible |

Thus, the formed body being light weight high strength can be produced by using carbon fiber.

EXAMPLES 25-28

The same surface-reformed slag having a BET specific surface area of 100 m²/g as the raw material for manufacturing the formed body of Examples 1-4 was used.

To 100 parts by weight of the above surface-reformed slag, each 5, 10, 20, 30 parts by weight (as the solid matter) of an aqueous suspension of polyethylene synthetic pulp (SWP-E790, manufactured by Mitsui Petrochemical Industries Co., Ltd.) was added, and then kneaded. The slurry was poured into a mold form, and formed with gradual dehydration by pressing. The formed bodies were dried at 60° C. for 15 hours and then at 110° C. for 5 hours to obtain the light weight formed bodies shown in FIG. 1.

COMPARATIVE EXAMPLE 3

An amorphous silicic acid and hydrated lime were blended so that the molar ratio of $SiO_2:CaO$ was 1:1, and 5 times in quantity of water was added. The mixture was allowed to react at 90° C. for 3 hours, and C—S—H gel (C:CaO, S:$SiO_2$, H:$H_2O$) was first obtained.

Subsequently, 3 times in quantity of water was added to the slurry, and allowed to react in an autoclave under the conditions of 209° C. and 19 kgf/cm²G for 3 hours with stirring to produce calcium silicate hydrate. The produced hydrate was confirmed to be xonotlite by powder X-ray diffraction.

The surface-modified slag was changed to the above xonotlite, and 10 parts by weight of the synthetic pulp was changed to the polymer dispersion (styrene-butadiene copolymer latex), and a light weight formed body was produced similar to Example 2.

The properties examination results are shown in Table 12.

TABLE 12

| | Example 25 | Example 26 | Example 27 | Example 28 | Comparative 3 |
|---|---|---|---|---|---|
| Composition (wt. part) | | | | | |
| Surface-Reformed Slag | 100 | 100 | 100 | 100 | 0 |
| Calcium Silicate Hydrate (Xonotlite) | 0 | 0 | 0 | 0 | 100 |
| Synthetic Pulp | 5 | 10 | 20 | 30 | 0 |
| Polymer Dispersion (SBR) | 0 | 0 | 0 | 0 | 10 |
| Properties | | | | | |
| Bulk Specific Gravity (g/cm³) | 0.50 | 0.50 | 0.50 | 0.50 | 0.50 |
| Bending Strength (kgf/cmphu 2) | 10 | 19 | 28 | 37 | 16 |
| Processibility | ○ | ○ | ○ | ○ | ○ |
| Combustibility | in-combustible | in-combustible | in-combustible | combustible | incombustible |
| Particle Size Distribution of Scruped Dust (wt %) | | | | | |
| +1190 μm | 41 | 48 | 58 | 67 | 8 |
| 690–1190 μm | 11 | 12 | 15 | 16 | 11 |
| 297–580 μm | 9 | 12 | 7 | 9 | 27 |
| −297 μm | 39 | 28 | 20 | 8 | 54 |
| Specular Gloss Gs (75°) | 31 | 49 | 53 | 64 | 21 |

Table 12 shows that, by adding synthetic pulp, dusting through the processing can be reduced, and the polished face shows beautiful gloss.

EXAMPLE 29

To the blend of Example 26, an aqueous suspension of 5 parts by weight of glass fiber (chopped strand of E glass, 13 mm in length, manufactured by Nitto Boseki Co., Ltd.) was added, and the light weight formed body was produced similarly.

COMPARATIVE EXAMPLE 4

To 100 parts by weight of the xonotlite powder of Comparative Example 1, the same aqueous suspension as Example 29 of 10 parts by weight of the synthetic pulp and 5 parts by weight of the glass fiber, and a light weight formed body was produced similar to Comparative Example 3.

The properties examination results of both formed bodies are shown in Table 13.

TABLE 13

| | Example 29 | Comparative Example 4 |
|---|---|---|
| Composition (wt. Part) | | |
| Surface-Reformed Slag | 100 | 0 |
| Calcium Silicate Hydrate (Xonotlite) | 0 | 100 |
| Synthetic Pulp | 10 | 10 |
| Glass Fiber | 5 | 5 |
| Properties | | |
| Bulk Specific Gravity (g/cm³) | 0.50 | 0.48 |
| Bending Strength (kgf/cm²) | 71 | 60 |
| Processibility | ○ | ○ |
| Combustibility | incombustible | incombustible |

The examination results show that the formed body using the surface-reformed slag is excellent in strength properties compared with the formed body using xonotlite.

EXAMPLE 30–32

To 100 parts by weight of the same surface-reformed slag at Example 1, synthetic pulp (SWP-E790, manufactured by Mitsui Petrochemical Industries Co., Ltd.), polymer dispersion (styrene-butadiene copolymer latex, Nipol LX-438C, manufactured by Nippon Zeon Co., Ltd.), glass fiber (chopped strand of E glass, 13 mm in length, manufactured by Nitto Boseki Co., Ltd.) were added in the rate shown in Table 14, and the light weight formed bodies were produced similarly.

The properties examination results of the obtained formed bodies are shown in Table 14.

TABLE 14

| | Example 29 | Example 30 | Example 31 | Example 32 |
|---|---|---|---|---|
| Composition (wt. part) | | | | |
| Surface-Reformed Slag | 100 | 100 | 100 | 100 |
| Snthetic Pulp | 10 | 5 | 10 | 15 |
| Polymer Dispersion (SBR) | 0 | 5 | 10 | 15 |
| Glass Fiber | 5 | 5 | 5 | 5 |
| Properties | | | | |

TABLE 14-continued

|  | Example 29 | Example 30 | Example 31 | Example 32 |
|---|---|---|---|---|
| Bulk Specific Gravity (g/cm³) | 0.50 | 0.50 | 0.50 | 0.50 |
| Bending Strength (kgf/cm²) | 71 | 79 | 91 | 97 |
| Processability | ○ | ○ | ○ | ○ |
| Combustibility | incombustible | incombustible | incombustible | combustible |

The examination results show that, the improvement in strength is possible by blending synthetic pulp and polymer dispersion, and though it is different according to actual blend, in general, the combined quantity is desirably less than 20% in view of combustibility.

EXAMPLE 33

To the blend of Example 30, 0.5 part by weight (0.5 part by weight to 1 part by weight of the polymer dispersion) of a cationic coagulant (SUNFLOC C454, manufactured by Sanyo Chemical Ind. Ltd.) was added, and the contaminated state of drainage with tile polymer was compared with Example 30 through forming by press dehydrating.

A small quantity of the polymer contamination was observed in the drainage in Example 30 (no coagulant was added), whereas it was not observed in Example 33 (a coagulant was added).

Thus, by using a coagulant, water filterability (dehydration ability) could be improved through forming, and the drainage treatment could be facilitated.

EXAMPLES 34-36

A light weight aggregate (Shirasu balloon, bulk density: 0.24, manufactured by Sanki Kogyo K.K.) was added to the blend of Example 33 in the rate shown in Table 15, and the light weight formed bodies were produced similarly.

The properties examination results of the produced formed bodies are shown in Table 15.

TABLE 15

|  | Example 33 | Example 34 | Example 35 | Example 36 |
|---|---|---|---|---|
| Composition (wt. part) | | | | |
| Surface-Reformed Slag | 100 | 100 | 100 | 100 |
| Synthetic Pulp | 5 | 5 | 5 | 5 |
| Polymer Dispersion (SBR) | 5 | 5 | 5 | 5 |
| Glass Fiber | 5 | 5 | 5 | 5 |
| Coagulant | 0.5 | 0.5 | 0.5 | 0.5 |
| Light Weight Aggregate (Shirasu Balloon) | 0 | 10 | 30 | 60 |
| Properties | | | | |
| Bulk Specific Gravity (g/cm³) | 0.50 | 0.48 | 0.45 | 0.41 |
| Bending Strength (kgf/cm²) | 78 | 80 | 65 | 54 |
| Processability | ○ | ○ | ○ | △ |
| Combustibility | incombustible | incombustible | incombustible | incombustible |

The examination results show that the formed body can be made lighter by blending a light weight aggregate, and the blending quantity is preferably less than 60% in view of processability.

EXAMPLE 37

On the basis of the blend of Example 34, a coloring test of the formed body by pigments was conducted. The pigments used were 4 kinds (all manufactured by Dainichi Seika K.K.), i.e. yellow (Ti—Sb—Ni), brown (Fe—Zn), green (Ti—Zn—Ni—Co) and blue (Co—Al—Zn), of dipyroxide color.

The surface-reformed slag has a good adsorptivity, and color unevenness did not occur and uniform coloring was possible.

EXAMPLE 38

The surface-reformed slag having a BET specific surface area of 100 m²/g prepared in Examples 25-28 was dehydrated under heating at 450° C. for 4 hours to obtain the surface-reformed slag of which the BET specific surface area was improved up to 120 m²/g.

Using the above surface-reformed slag of 120 m²/g, the light weight formed body was produced similar to Example 33.

Figure 7:
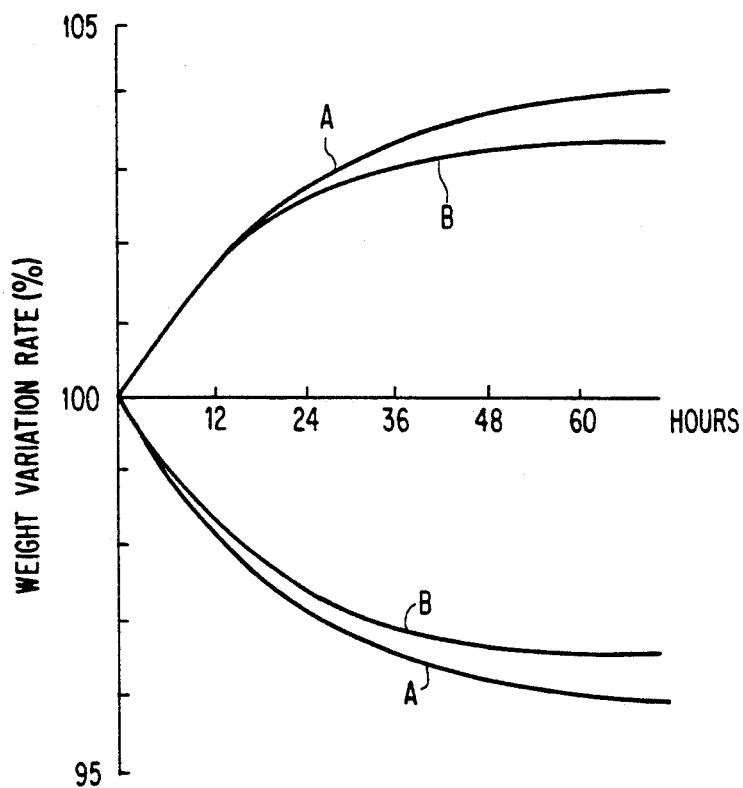
FIG. 7 is a graph illustrating curves showing moisture absorption-desorption properties as to the formed bodies using two kinds of the surface-reformed slags.

The properties examination results are shown in Table 16 and FIG. 7.

TABLE 16

|  | Example 38 | Comparative Example (Example 33) |
|---|---|---|
| Composition (wt. Part) | | |
| Surface-Reformed Slag (120 m²/g) | 100 | 0 |
| Surface-Reformed Slag (100 m²/g) | 0 | 100 |
| Synthetic Pulp | 5 | 5 |
| Polymer | 5 | 5 |
| Glass Fiber | 5 | 5 |
| Coagulant | 0.5 | 0.5 |
| Properties | | |
| Bulk Specific Gravity (g/cm³) | 0.47 | 0.50 |
| Bending Strength (kgf/cm²) | 80 | 78 |
| Processability | ○ | ○ |
| Combustibility | incombustible | incombustible |

The measured results of the moisture absorption-desorption properties of the light weight formed body of this Example (A) and that of Example 33 (B) are shown in FIG. 7. The moisture absorption curve was obtained by measuring the weight variation with time when RH was elevated from 50% to 90% at 20° C., and the moisture desorption curve was obtained by measuring the weight variation with time when RH was lowered from 90% to 50% at 20° C. conversely.

The results of Table 16 and FIG. 7 show that the improvement in the specific strength (strength/specific gravity) and in the moisture absorption-desorption properties is possible by using the surface-reformed slag of 120 m²/g.

EXAMPLES 39-41, COMPARATIVE EXAMPLES 5,6

The surface-reformed slag produced in Examples 1-4 and the calcium silicate hydrate (xonotlite) produced in Comparative Example 1 were mixed in the rate shown in Table 17, and 10 parts by weight (as the solid matter) of a polymer dispersion (styrene-butadiene copolymer latex, Nipol LX-438C, manufactured by Nippon Zeon, Co., Ltd.) and water were added thereto, and then kneaded. The slurry was poured into a mod form, and formed with gradual dehydration by pressing. The formed bodies were dried at 60° C. for 15 hours and then at 110° C. for 5 hours to obtain the light weight formed bodies shown in FIG. 1.

Figure 8:
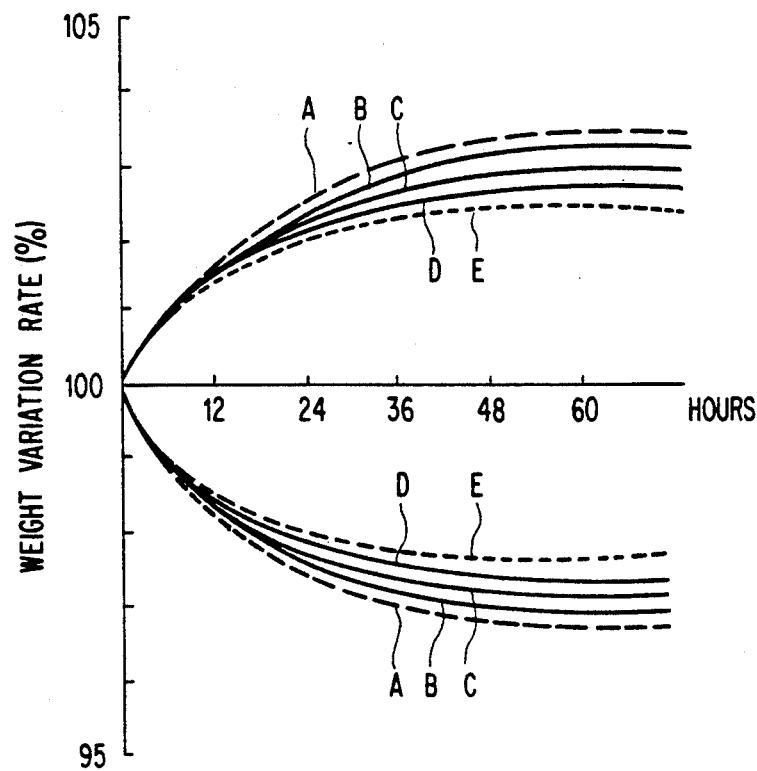
FIG. 8 is a graph illustrating curves showing moisture absorption-desorption properties as to products of the invention and conventional products.

The properties examination results are shown in Table 17 and FIG. 8.

TABLE 17

| | Comparative 5 | Example 39 | Example 40 | Example 41 | Comparative 6 |
|---|---|---|---|---|---|
| Composition (wt. part) | | | | | |
| Surface-Reformed Slag | 100 | 70 | 50 | 30 | 0 |
| Calcium Silicate Hydrate (Xonotlite) | 0 | 30 | 50 | 90 | 100 |
| Polymer Dispersion (SBR) | 10 | 10 | 10 | 10 | 10 |
| Properties | | | | | |
| Bulk Specific Gravity (g/cm$^3$) | 0.50 | 0.50 | 0.50 | 0.50 | 0.50 |
| Bending Strength (kgf/cm$^2$) | 21 | 21 | 18 | 17 | 16 |
| Processibility | ○ | ○ | ○ | ○ | ○ |
| Combustibility | incombustible | incombustible | incombustible | incombustible | incombustible |
| Variation Rate in Length (%) Dried | −0.078 | −0.071 | −0.060 | −0.048 | −0.041 |
| Variation Rate in Length (%) Water-Absorbed | +0.105 | +0.084 | +0.067 | +0.052 | +0.033 |
| Water Filterability (sec.) | 820 | 710 | 650 | 630 | 610 |

The measured results of the moisture absorption-desorption properties of respective light weight formed bodies of Example 39 (B), Example 40 (C), Example 41 (D), Comparative Example 5 (A) and Comparative Example 6 (E) are shown in FIG. 8. The moisture absorption curve was obtained by measuring the weight variation with time when RH was elevated from 50% to 90% at 20° C., and the moisture desorption curve was obtained by measuring the weight variation with time when RH was lowered from 90% to 50% at 200° C. conversely.

The results of Table 17 and FIG. 8 show that the surface-reformed slag was very excellent in hygroscopic property and water absorptivity, and it exhibits excellent moisture absorption-desorption properties. While, though the variation rate in length and water-filtering time are slightly greater than xonotlite, when the requirements for dimensional stability and forming ability are great, they can be improved by mixing xonotlite. Since the moisture absorption-desorption properties reduce by mixing xonotlite, the mixing rate of the surface-reformed slag and xonotlite may be determined according to the required properties.

EXAMPLE 42

To the blend of Example 39, an aqueous suspension of 5 parts by weight of glass fiber (chopped strand of E glass, 13 mm in length, manufactured by Nitto Boseki Co., Ltd.), and the light weight formed body was produced similarly.

The properties examination results of the formed body are shown in Table 18 in comparison with Comparative Example 2.

TABLE 18

| | Example 42 | Comparative Example 2 |
|---|---|---|
| Composition (wt. Part) | | |
| Surface-Reformed Slag | 70 | 0 |
| Calcium Silicate Hydrate (Xonotlite) | 30 | 100 |
| Polymer Dispersion (SBR) | 10 | 10 |
| Glass Fiber | 5 | 5 |
| Properties | | |
| Bulk Specific Gravity (g/cm$^3$) | 0.50 | 0.50 |
| Bending Strength (kgf/cm$^2$) | 78 | 69 |
| Processibility | ○ | ○ |
| Combustibility | incombustible | incombustible |

The results of Table 18 show that the mixture of the surface-reformed slag and xonotlite is superior in strength properties.

EXAMPLE 43

To the blend of Example 42, 0.5 part by weight (0.1 part by weight to 1 part by weight of the polymer dispersion) of a cationic coagulant (SUNFLOC C454, manufactured by Sanyo Chemical Ind. Ltd.) was added, and the contaminated state of drainage with the polymer was compared with Example 42 through forming by press dehydrating.

A small quantity of the polymer contamination was observed in the drainage in Example 42 (no coagulant was added), whereas it was not observed in Example 43 (a coagulant was added).

Thus, by using a coagulant, water filterability (dehydration ability) could be improved through forming, and the drainage treatment could be facilitated.

EXAMPLE 44

In the blend of Example 43, the polymer dispersion was changed to 5 parts by weight, and an aqueous suspension of 5 parts by weight of polyethylene synthetic pulp (SWP-E790, manufactured by Mitsui Petrochemical Industries Co., Ltd.) and 0.5 part by weight of a cationic coagulant, and the light weight formed body was produced similarly.

COMPARATIVE EXAMPLE 7

In the blend of Example 43, the polymer dispersion was changed to 5 parts by weight, and the same aqueous suspension of 5 parts by weight of the polyethylene synthetic pulp and 0.5 part by weight of the cationic coagulant, and the light weight formed body was produced similarly.

The properties examination results of both formed bodies are shown in Table 19.

TABLE 19

|  | Example 44 | Compartive Example 7 |
|---|---|---|
| Composition (wt. Part) | | |
| Surface-Reformed Slag | 70 | 0 |
| Calcium Silicate Hydrate (Xonotlite) | 30 | 100 |
| Polymer Dispersion (SBR) | 5 | 5 |
| Synthetic Pulp | 5 | 5 |
| Glass Fiber | 5 | 5 |
| Coagulant | 0.5 | 0.5 |
| Properties | | |
| Bulk Specific Gravity (g/cm$^3$) | 0.50 | 0.50 |
| Bending Strength (kgf/cm$^2$) | 76 | 65 |
| Processibility | O | O |
| Combustibility | incombustible | incombustible |

The results of Table 19 show that the mixture of the surface-reformed slag and xonotlite is superior in strength properties.

EXAMPLES 45-47

To the blend of Example 45, light weight aggregate (shirasu balloon, bulk density: 0.24, manufactured by Sanki Kogyo K.K.) was added in the rate shown in Table 20, and the formed body was produced similarly.

The properties examination results of the produced formed body are shown in Table 20.

TABLE 20

|  | Example 44 | Example 45 | Example 46 | Example 47 |
|---|---|---|---|---|
| Composition (wt. part) | | | | |
| Surface-Reformed Slag | 70 | 70 | 70 | 70 |
| Calcium Silicate Hydrate (Xonotlite) | 30 | 30 | 30 | 30 |
| Polymer Dispersion (SBR) | 5 | 5 | 5 | 5 |
| Synthetic Pulp | 5 | 5 | 5 | 5 |
| Glass Fiber | 5 | 5 | 5 | 5 |
| Coagulant | 0.5 | 0.5 | 0.5 | 0.5 |
| Light Weight Aggregate (Shirasu Balloon) | 0 | 10 | 30 | 60 |
| Properties | | | | |
| Bulk Specific Gravity (g/cm$^3$) | 0.50 | 0.48 | 0.45 | 0.41 |
| Bending Strength (kgf/cm$^2$) | 76 | 75 | 61 | 50 |
| Processibility | O | O | O | Δ |
| Combustibility | incombustible | incombustible | incombustible | incombustible |

The examination results show that the formed body can be made lighter by blending light weight aggregate. In view of processibility, the blending quantity is preferably less than 60%.

EXAMPLE 48

On the basis of the blend of Example 45, a coloring test of the formed body by pigments was conducted. The pigments used were 4 kinds (all manufactured by Dainichi Seika K.K.), i.e. yellow (Ti—Sb—Ni), brown (Fe—Zn), green (Ti—Zn—Ni—Co) and blue (Co—Al—Zn), of dipyroxide color.

The surface-reformed slag has a good adsorptivity, and color unevenness did not occur and uniform coloring was possible.

EXAMPLE 49, COMPARATIVE EXAMPLE 8

The surface-reformed slag having a BET specific surface area of 100 m$^2$/g prepared in Examples 1-4 was dehydrated under heating at 450° C. for 4 hours to obtain the surface-reformed slag for which the BET specific surface area was improved up to 120 m$^2$/g.

Using the above surface-reformed slag of 120 m$^2$/g, the light weight formed body was produced similar to Example 44.

Figure 9:
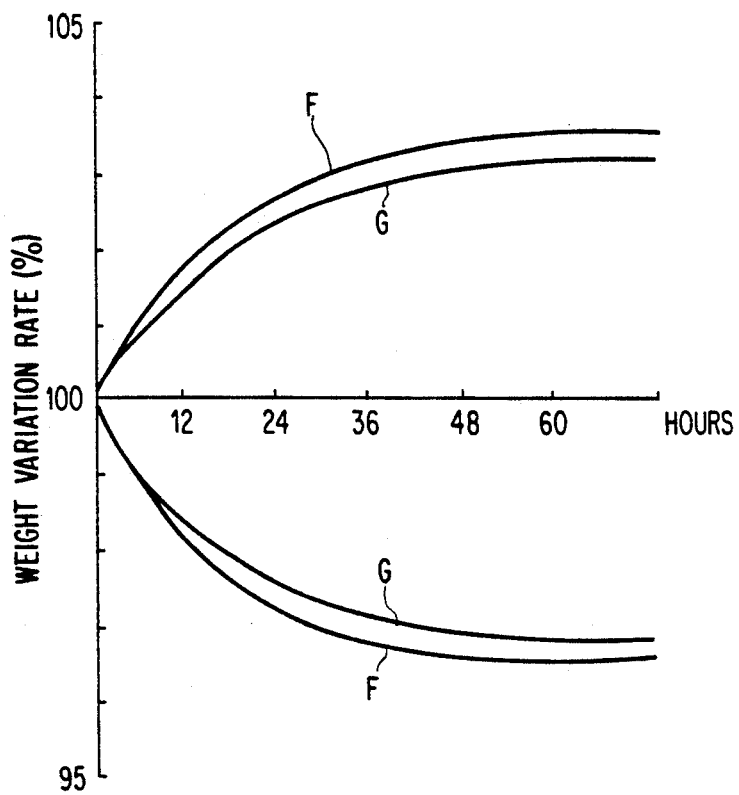
FIG. 9 is a graph illustrating similar curves as to the formed bodies using two kinds of the surface-reformed slags, respectively.

The properties examination results are shown in Table 21 and FIG. 9.

TABLE 21

|  | Example 49 | Comparative Example 8 (Example 44) |
|---|---|---|
| Composition (wt. Part) | | |
| Surface-Reformed Slag (120 m$^2$/g) | 70 | |
| Surface-Reformed Slag (100 m$^2$/g) | | 90 |
| Calcium Silicate Hydrate (Xonotlite) | 30 | 30 |
| Polymer Dispersion (SBR) | 5 | 5 |
| Synthetic Pulp | 5 | 5 |
| Glass Fiber | 5 | 5 |
| Coagulant | 0.5 | 0.5 |
| Properties | | |
| Bulk Specific Gravity (g/cm$^3$) | 0.47 | 0.50 |
| Bending Strength (kgf/cm$^2$) | 79 | 76 |
| Processibility | O | O |
| Combustibility | incombustible | incombustible |

The results of the moisture absorption-desorption properties of the light weight formed body of Example 49 (F) measured similar to the light weight formed body of Comparative Example 8 (G) is shown in FIG. 9 together.

The results of Table 21 and FIG. 9 show that the improvement in the specific strength (strength/specific gravity) and in the moisture absorption-desorption properties is possible by using the surface-reformed slag of 120 m$^2$/g.

EXAMPLES 50-55

Glassy blast furnace slag was ground up to a Blaine specific surface area of 4,500 cm$^2$/g by a ball mill, and classified as the raw material for classification by an air classifier to obtain a pulverized slag having a Blaine specific surface area of 14,000 cm$^2$/g.

The pulverized slag was added to NaOH solution 3 normal in concentration at a temperature of 90° C. at a rate of 5 g per 100 ml thereof, and treated with stirring for 3 hours to obtain the surface-reformed slag of a BET specific surface area of 100 m$^2$/g. The surface-reformed slag was sufficiently washed with water to remove alkali materials and dried, and used as the raw material for producing the formed body.

To 100 parts by weight of the surface-reformed slag, calcined gypsum (manufactured by Yoshino Sekko) was added at a rate shown in Table 22, and an aqueous suspension of 10 parts by weight (as the solid matter) of a polymer dispersion (styrene-butadiene copolymer latex, Nipol LX-438C, manufactured by Nippon Zeon Co., Ltd.) and 5 parts by weight of glass fiber (chopped strand of E glass, 13 mm in length manufactured by Nitto Boselki Co., Ltd.) was further added, and then kneaded. The slurry was poured in a mold form, and formed with gradual dehydration by pressing. This formed body was dried at 60° C. for 15 hours and then at 110° C. for 5 hours to obtain the light weight formed.

The properties examination results are shown in Table

TABLE 22

|  | Example 50 | Example 51 | Example 52 | Example 53 | Example 54 | Example 55 | Comparative (Example 9) | Comparative 2 |
|---|---|---|---|---|---|---|---|---|
| Composition (wt. part) | | | | | | | | |
| Surface-Reformed Slag | 100 | 100 | 100 | 100 | 100 | 100 | 100 | 0 |
| Calcium Silicate Hydrate (Xonotlite) | 0 | 0 | 0 | 0 | 0 | 0 | 0 | 100 |
| Calcined Gypsum | 10 | 30 | 50 | 70 | 100 | 150 | 0 | 0 |
| Polymer Dispersion (SBR) | 10 | 10 | 10 | 10 | 10 | 10 | 10 | 10 |
| Glass Fiber | 5 | 5 | 5 | 5 | 5 | 5 | 5 | 5 |
| Properties | | | | | | | | |
| Bulk Specific Gravity (g/cm$^3$) | 0.50 | 0.50 | 0.50 | 0.50 | 0.50 | 0.50 | 0.50 | 0.50 |
| Bending Strength (kgf/cm$^2$) | 85 | 92 | 101 | 94 | 88 | 72 | 82 | 69 |
| Processibility | ○ | ○ | ○ | ○ | ○ | △ | ○ | ○ |
| Combustibility | incombustible | incombustible | incombustible | incombustible | incombustible | incombustible | incombustible | incombustible |

The results of Table 22 show that, by blending calcined gypsum, it is possible to improve strength of the light weight formed body without reducing the processibility and the incombustibility.

EXAMPLE 56

To the blend of Example 52, 1 part by weight (0.1 part by weight to 1 part by weight of the polymer dispersion) of a cationic coagulant (SUNFLOC C454, manufactured by Sanyo Chemical Ind. Ltd.) was added, and the contaminated state of drainage with the polymer was compared with Example 52 through forming by press dehydrating.

A small quantity of the polymer contamination was observed in the drainage in Example 52 (no coagulant was added), whereas it was not observed in Example 56 (a coagulant was added).

Thus, by using a coagulant, water filterability (dehydration ability) could be improved through forming, and the drainage treatment could be facilitated.

EXAMPLE 57-59

To the same aqueous suspension as Examples 50-55 of 100 parts by weight of the surface-reformed slag, 50 parts by weight of the calcined gypsum and 5 parts by weight of the glass fiber, the polymer dispersion and the cationic coagulant were added varying the blending quantities as shown in Table 23, and the light weight formed bodies were produced similarly.

The properties examination results of the obtained formed bodies are shown in Table 23.

TABLE 23

|  | Example 57 | Example 58 | Example 59 | Comparative 9 |
|---|---|---|---|---|
| Composition (wt. part) | | | | |
| Surface-Reformed Slag | 100 | 100 | 100 | 100 |
| Calcined Gypsum | 50 | 50 | 50 | 0 |
| Polymer Dispersion (SBR) | 10 | 7 | 5 | 10 |
| Glass Fiber | 5 | 5 | 5 | 5 |
| Coagulant | 1.0 | 0.7 | 0.5 | 1.0 |
| Properties | | | | |
| Bulk Specific Gravity (g/cm$^3$) | 0.50 | 0.50 | 0.50 | 0.50 |
| Bending Strength (kgf/cm$^2$) | 102 | 89 | 76 | 81 |
| Processibiltity | ○ | ○ | ○ | ○ |
| Combustibility | incombustible | incombustible | incombustible | incombustible |

COMPARATIVE EXAMPLE 9

In the blend of Example 57, the calcined gypsum was not added, and produced a formed body similarly.

The results of Table 23 show that, by adding gypsum, when polymer dispersion is decreased, the strength equivalent to the no blending product can be secured.

EXAMPLE 60

To the blend of Example 59, an aqueous suspension of 5 parts by weight of polyethylene synthetic pulp (SWP-E790, manufactured by Mitsui Petrochemical Industries Co., Ltd.) was added, and the light weight formed body was produced similarly.

The properties examination results of the obtained formed body are shown in Table 24.

TABLE 24

|  | Example 60 | Comparative Example (Example 57) |
|---|---|---|
| Composition (wt. Part) | | |
| Surface-Reformed Slag | 100 | 100 |
| Calcined Gypsum | 50 | 50 |
| Polymer Dispersion (SBR) | 5 | 10 |
| Synthetic Pulp | 5 | 0 |
| Glass Fiber | 5 | 5 |
| Coagulant | 0.5 | 1 |
| Properties | | |
| Bulk Specific Gravity (g/cm$^3$) | 0.50 | 0.50 |
| Bending Strength (kgf/cm$^2$) | 96 | 102 |
| Processibility | ○ | ○ |
| Cumbustibility | incombustible | incombustible |
| Particle Size Distribution of Scruped Dust (wt %) | | |
| +1190 μm | 45 | 10 |
| 590-1190 μm | 11 | 12 |
| 297-590 μm | 10 | 29 |
| −298 μm | 34 | 49 |

TABLE 24-continued

|  | Example 60 | Comparative Example (Example 57) |
|---|---|---|
| Specular Gloss Gs (75°) | 40 | 23 |

The results of Table 24 show that, by adding synthetic pulp, to reduce dusting through the processing and to improve the surface gloss are possible.

EXAMPLE 61

In the blend of Example 60, the surface-reformed slag was 70 parts by weight, and the calcium silicate hydrate (xonotlite) produced in Comparative Example 1 was 30 parts by weight, and the light weight formed body was produced similarly.

The properties examination results of the obtained formed body are shown in Table 25.

TABLE 25

|  | Example 61 | Comparative Example (Example 60) |
|---|---|---|
| Composition (wt. Part) | | |
| Surface-Reformed Slag | 70 | 100 |
| Calcium Silicate Hydrate (Xonotlite) | 30 | 0 |
| Calcined Gypsum | 50 | 50 |
| Polymer Dispersion (SBR) | 5 | 5 |
| Synthetic Pulp | 5 | 5 |
| Glass Fiber | 5 | 5 |
| Coagulant | 0.5 | 0.5 |
| Properties | | |
| Bulk Specific Gravity (g/cm$^3$) | 0.50 | 0.50 |
| Bending Strength (kgf/cm$^2$) | 95 | 96 |
| Processibility | ○ | ○ |
| Combustibility | incombustible | incombustible |
| Variation Rate in Length (%)    Dried | −0.064 | −0.072 |
|       Water-Absorbed | +0.077 | +0.097 |
| Water Filterability (sec.) | 720 | 860 |

The results of Table 25 show that a part of the surface-reformed slag can be replaced by xonotlite in order to improve the dimensional stability and the formability.

EXAMPLES 62–64

To the blend of Example 61, light weight aggregate (shirasu balloon, bulk density: 0.24, manufactured by Sanki Kogyo K.K.) was added at a rate shown in Table 26, and the formed bodies were produced similarly.

The properties examination results are shown in Table 26.

TABLE 26

|  | Comparative (Example 61) | Example 62 | Example 63 | Example 64 |
|---|---|---|---|---|
| Composition (wt. part) | | | | |
| Surface-Reformed Slag | 70 | 70 | 70 | 70 |
| Calcium Silicate Hydrate (Xonotlite) | 30 | 30 | 30 | 30 |
| Light Weight Aggregate (Shirasu Balloon) | 0 | 10 | 30 | 50 |
| Calcined Gypsum | 50 | 50 | 50 | 50 |
| Polymer Dispersion (SBR) | 5 | 5 | 5 | 5 |
| Synthetic Pulp | 5 | 5 | 5 | 5 |
| Glass Fiber | 5 | 5 | 5 | 5 |
| Coagulant | 0.5 | 0.5 | 0.5 | 0.5 |
| Properties | | | | |
| Bulk Specific Gravity (g/cm$^3$) | 0.50 | 0.48 | 0.45 | 0.41 |
| Bending Strength (kgf/cm$^2$) | 95 | 92 | 80 | 61 |
| Processibility | ○ | ○ | ○ | Δ |
| Combustibility | incombustible | incombustible | incombustible | incombustible |

The results of Table 26 show that, by blending light weight aggregate, the formed body can be made lighter and the heat-insulating ability can be improved. In view of processibility, the blending quantity is preferably less than 50%.

EXAMPLE 65

On the basis of the blend of Example 62, a coloring test of the formed body by pigments was conducted. The pigments used were 4 kinds (all manufactured by Dainichi Seika K.K.), i.e. yellow (Ti—Sb—Ni), brown (Fe—Zn), green (Ti—Zn—Ni—Co) and blue (Co—Al—Zn), of dipyroxide color.

The surface-reformed slag has a good adsorptivity, and color unevenness did not occur and uniform coloring was possible.

EXAMPLE 66

The surface-reformed slag having a BET specific surface area of 100 m$^2$/g prepared in Examples 50–55 was dehydrated under heating at 450° C. for 4 hours to obtain the surface-reformed slag of which the BET specific surface area was improved up to 120 m$^2$/g.

Using the above surface-reformed slag of 120 m$^2$/g, the light weight formed body was produced similar to Example 61.

Figure 10:
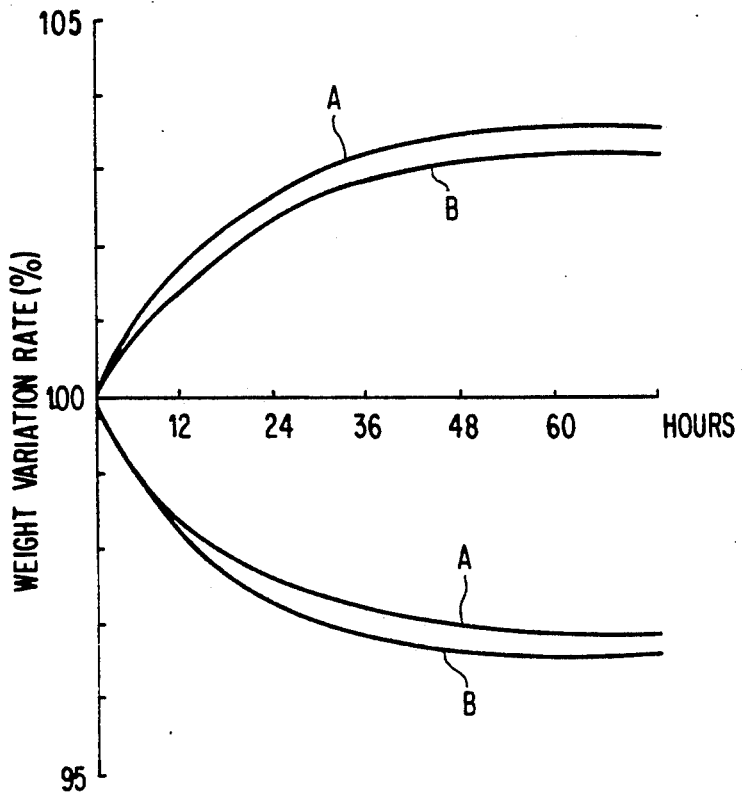
FIG. 10 is a graph illustrating curves showing moisture absorption-desorption properties as to the formed bodies using two kinds of the surface-reformed slags.

The properties examination results are shown in Table 27 and FIG. 10.

TABLE 27

|  | Example 66 | Comparative Example (Example 61) |
|---|---|---|
| Composition (wt. Part) | | |
| Surface-Reformed Slag (120 m$^2$/g) | 70 | |
| Surface-Reformed Slag (100 m$^2$/g) | | 70 |
| Calcium Silicate Hydrate (Xonotlite) | 30 | 30 |
| Calcined Gypsum | 50 | 50 |
| Polymer Dispersion | 5 | 5 |
| Synthetic Pulp | 5 | 5 |
| Glass Fiber | 5 | 5 |
| Coagulant | 0.5 | 0.5 |
| Properties | | |
| Bulk Specific Gravity (g/cm$^3$) | 0.47 | 0.50 |
| Bending Strength (kgf/cm$^2$) | 98 | 95 |
| Processibility | ○ | ○ |
| Combustibility | incombustible | incombustible |

The measured results of the moisture absorption-desorption properties of the light weight formed body of this Example (A) and that of Example 61 (B) are shown in FIG. 10. The moisture absorption curve was obtained by measuring the weight variation with time when RH was elevated from 50% to 90% at 20° C., and the moisture desorption curve was obtained by measuring the weight variation with time when RH was lowered from 90% to 50% at 20° C. conversely.

The results of Table 27 and FIG. 10 show that the improvement in the specific strength (strength/specific gravity) and in the moisture absorption-desorption properties is possible by using the surface-reformed slag of 120 m²/g.

EXAMPLE 67

To 100 parts by weight of the surface-reformed slag having a BET specific surface area of 100 m²/g, 10 parts by weight as the solid matter of ethylene-vinyl acetate (EVA) (MOWITON J, manufactured by Hoechst Gosei Co., Ltd.) as the polymer dispersion, 5 parts by weight of E glass fiber (chopped strand, 25 mm) and 300 parts by weight of water were added, and then kneaded.

0.10 part by weight of SUNFLOC C454 (manufactured by Sanyo Chemical Ind. Ltd.) per 1 part by weight of the polymer dispersion was further added as the coagulant, and forming was conducted by press dehydration. The formed body was dried at 60° C. for 15 hours and then at 110° C. for 5 hours to obtain the light weight formed body having a bulk density of 0.50 g/cm³. The properties are shown in Table 28 in comparison with a commercial artificial wood (xonotlite group, trade name: WOODYCERAM, manufactured by Ube Industries Ltd.) as a reference material.

TABLE 28

| | Example 67 | Comparative | Remarks |
|---|---|---|---|
| Bulk Specific Gravity (g/cm³) | 0.50 | 0.50 | |
| Bending Strength (kgf/cm²) | 80 | 66 | JIS A 1106 |
| Water Absorption Amount (g/cm²) | 0.55 | 0.54 | JIS A 2104 Water absorption for 24 hours |
| Resistance to Taking Out of Nail (kgf/cm) | 10 | 10 | JIS Z 2121 |
| BET Specific Surface Area | 100 m²/g | 30 m²/g | |

Figure 11:
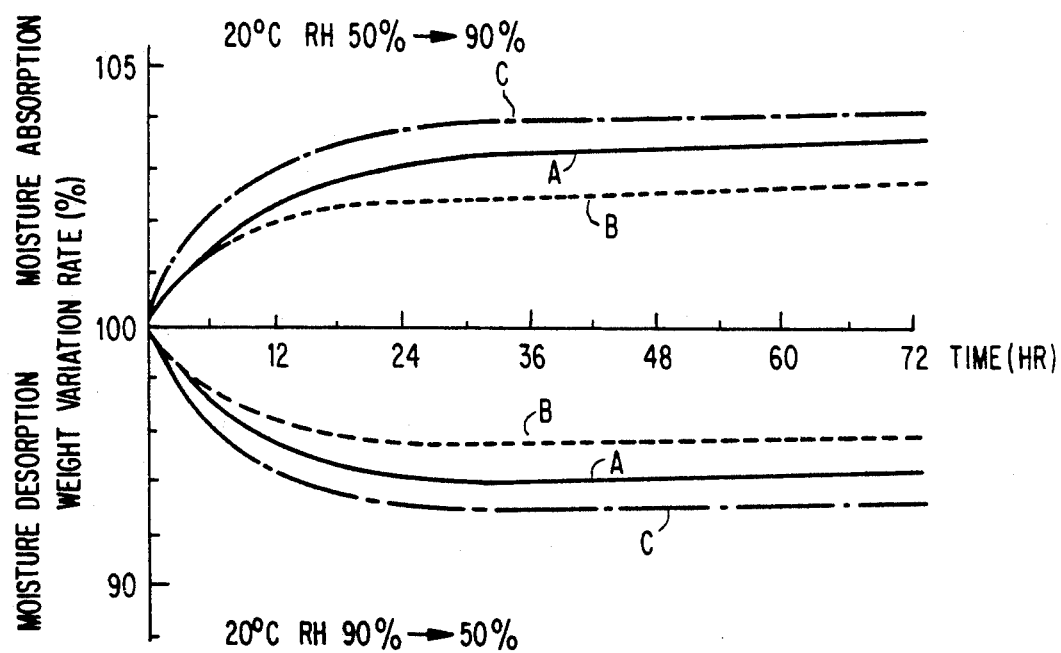
FIG. 11 is a graph illustrating curves showing moisture absorption-desorption properties as to a light weight formed body produced in a method of the invention and a conventional light weight formed body, respectively.
Figure 12:
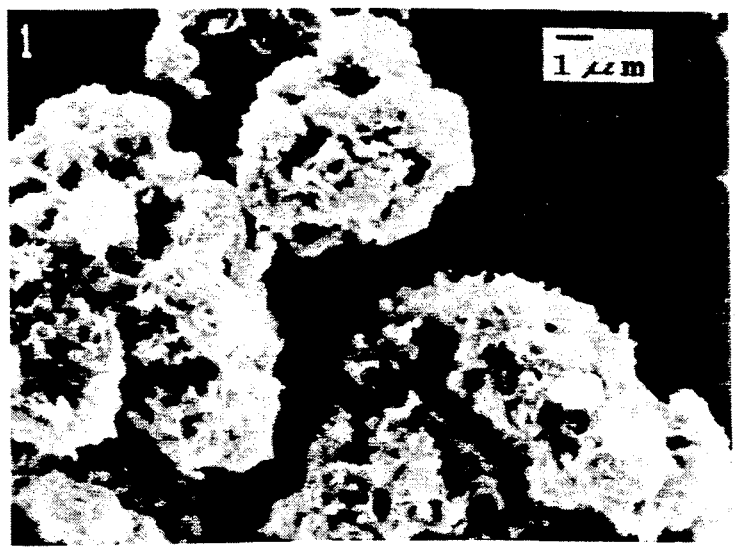
FIG. 12 is a photograph of scanning electron microscope showing particle structures of the surface-reformed slag.
Figure 13:
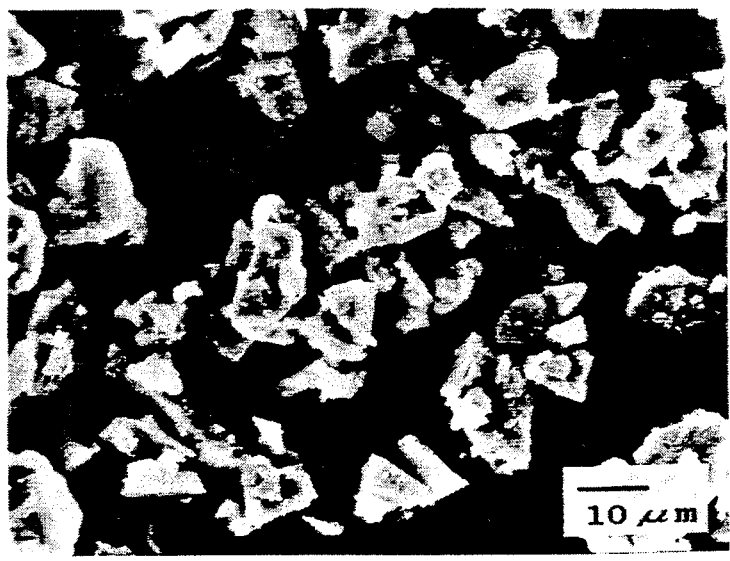
FIG. 13 is that of a glassy blast furnace slag.

The measured results of the moisture absorption-desorption properties of the product of Example 67 (A), a comparative product (B) being a commercial product and another comparative product being Japanese cypress are shown in FIG. 11. It is seen that the light weight formed body produced by the method of the invention has a moisture controlling ability near Japanese cypress.

EXAMPLE 68

To 100 parts by weight of the surface-reformed slag having a BET specific surface area of 100 m²/g, 10 parts by weight of polyethylene synthetic pulp (trade name: SWP-E790 [manufactured by Mitsui Petrochemical Industries Co., Ltd.]), 3.0 parts by weight of glass fiber and 400 parts by weight of water were added, and then kneaded 0.1 part by weight of a coagulant (SUNFLOC C454 [manufactured by Sanyo Chemical Ind. Ltd.]) was added thereto, and forming was conducted by press dehydration. The formed body was heated at 110° C. for 15 hours.

Subsequently, to the above blend (Example 68), 5 parts by weight of a polymer dispersion (styrene-butadiene copolymer emulsion, Nipol LX-438C [Nippon Zeon Co., Ltd.]) was further added (Example 69), and the light weight formed body was produced similarly.

A comparison of the property values of the light weight formed body of the invention with an artificial wood (WOODYCERAM of Ube) is shown in Table 29.

The evaluation of the properties was conducted by a particle size distribution of cutting dust by a cutter for wood (% of each particle size divided by using standard sieves) and by a glossiness according to JIS Z 8741-1962.

TABLE 29

| | Particle Size Distribution of Cutting Dust (μm) | | | | Amount of Hygroscopic Water* (g/cm³) | Specular Gloss Gs (75°) |
|---|---|---|---|---|---|---|
| | +1190 | 1190-590 | 590-297 | -297 | | |
| Example 68 | 58 | 16 | 9 | 17 | 0.55 | 62 |
| Example 69 | 62 | 15 | 8 | 15 | 0.52 | 53 |
| Comparative | 2 | 7 | 30 | 58 | 0.54 | 18 |

*The amount of hydgroscopic water was JIS A 2104-1957 (water absorption for 24 hours)

The above results show that, by adding synthetic pulp, the effect to prevent dusting and to improve surface gloss are obtained.

INDUSTRIAL APPLICABILITY

The light weight formed body of the invention is superior to the conventional product using needle like calcium silicate hydrate such as xonotlite particularly in moisture controlling functions due to the fundamental difference in properties and states, in spite of using a reformed product of inexpensive blast furnace slag. It is easily presumed that the influence as inorganic powder upon health is substantially none. Since the surface-reformed slag has more crystillization water than xonotlile, autolysis can be expected. Moreover, the processibility such as cutting, scraping and nailing is excellent, and the formed body also has the characteristics such as incombustibility, rare occurrence of dimensional change and no possibility of rot and degradation. Besides, when synthetic pulp is added, processibility is further excellent, and dusting during processing reduces. Furthermore, surface glossiness is excellent, and the water filterability during processing to form the formed body is improved. When a calcium silicate hydrate having a high needle property of which the quantity of crystillization water is small such as xonotlite is added, heat resistance, dimensional stability, water filterability during forming and the like are improved. When gypsum is added, strength such as bending strength rises without inducing problems such as decrease of incombustibility.

We claim:
1. A light weight formed body having a bulk specific gravity of 0.2 to 1 g/cm³ and which can be cut, scraped and nailed comprising a (i) powder having a BET surface area of 100–140 m²/g produced by reforming a glassy blast furnace slag powder with an alkali aqueous solution through a dissolution reaction and a hydration reaction of glass or comprising a (ii) powder having a BET surface area of 100–140 m²/g produced by reform- ing a glassy blast furnace slag powder with an alkali aqueous solution through a dissolution reaction and a hydration reaction of glass and then dehydrating with heating, and comprising a polymer dispersion, wherein the light weight formed body comprises 3 to 20% of the polymer dispersion as ratio by weight of solid matter to the powder produced by reforming the glassy blast furnace slag powder, 2 to 10% of glass fiber as ratio by weight to the powder produced by reforming the glassy blast furnace slag powder and 0.05 to 0.2 part of a cationic polymer coagulant by weight per 1 part by weight to the solid matter of the polymer dispersion.

2. The light weight formed body of claim 1 which further comprises at least one member selected from the group consisting of 3 to 20% of a synthetic pulp as ratio by weight to the powder produced by reforming the glassy blast furnace slag powder, a calcium silicate hydrate in a blending ratio by weight of the powder produced by reforming the glassy blast furnace slag powder to the calcium silicate hydrate of 7:3 to 3:7, 10 to 150% of hydraulic gypsum as ratio by weight to the powder produced by reforming the glassy blast furnace slag powder, not more than 60% of a light weight aggregate as ratio by weight to the powder produced by reforming the glassy blast furnace slag powder, a thickener, a dispersing agent, and a pigment.

3. The light weight formed body of claim 2 wherein the member is 3 to 20% of the synthetic pulp.

4. The light weight formed body of claim 2 wherein the member is the thickener.

5. The light weight formed body of claim 2 wherein the member is the dispersing agent.

6. The light weight formed body of claim 2 wherein the member is 30 to 70% of the hydraulic gypsum as ratio of weight to the powder produced by reforming the glassy blast furnace slag powder.

7. The light weight formed body of claim 1 wherein the BET surface area is not less than 120 m$^2$/g.

8. The light weight formed body of claim 1 wherein the bulk specific gravity is 0.4 to 0.6 g/cm$^3$.

9. The light weight formed body of claim 1 wherein the polymer dispersion is acrylic-modified epoxy resin.

10. The light weight formed body of claim 1 wherein the polymer dispersion is a mixture of acrylic-modified epoxy resin and a rubber latex.

11. The light weight formed body of claim 1 which comprises the (ii) powder having a BET surface area of 100-140 m$^2$/g produced by reforming a glassy blast furnace slag powder with an alkali aqueous solution through a dissolution reaction and a hydration reaction of glass and then dehydrating with heating.

12. The light weight formed body of claim 1 wherein the cationic polymer coagulant is a member selected from the group consisting of polydialkylaminoalkylacrylate, polyaminomethylacrylamide, polyvinylpyridinium halide and polyvinylimidazoline.

13. A light weight formed body having a bulk specific gravity of 0.2 to 1 g/cm$^3$ and which can be cut, scraped and nailed consisting essentially of a (i) powder having a BET surface area of 100-140 m$^2$/g produced by reforming a glassy blast furnace slag powder with an alkali aqueous solution through a dissolution reaction and a hydration reaction of glass or a (ii) powder having a BET surface area of 100-140 m$^2$/g produced by reforming a glassy blast furnace slag powder with an alkali aqueous solution through a dissolution reaction and a hydration reaction of glass and then dehydrating with heating, in combination with 3 to 20% of a polymer dispersion as ratio by weight of solid matter to the powder produced by reforming the glassy blast furnace slag powder, 2 to 10% of glass fiber as ratio by weight to the powder produced by reforming the glassy blast furnace slag powder and 0.05 to 0.2 part of a cationic polymer coagulant by weight per 1 part by weight to the solid matter of the polymer dispersion.

14. The process for producing a light weight formed body having a bulk specific gravity of 0.2 to 1 g/cm$^3$ and which can be cut, scraped, and nailed, which light weight formed body comprises a (i) powder having a BET surface area of 100-140 m$^2$/g produced by reforming a glassy blast furnace slag powder with an alkali aqueous solution through a dissolution reaction and a hydration reaction of glass or comprises a (ii) powder having a BET surface area of 100-140 m$^2$/g produced by reforming a glassy blast furnace slag powder with an alkali aqueous solution through a dissolution reaction and a hydration reaction of glass and then dehydrating with heating, and comprises a polymer dispersion, and wherein the light weight formed body comprises 3 to 20% of the polymer dispersion as ratio by weight of solid matter to the powder produced by reforming the glassy blast furnace slag powder, 2 to 10% of glass fiber as ratio by weight to the powder produced by reforming the glassy blast furnace slag powder and 0.05 to 0.2 part of a cationic polymer coagulant by weight per 1 part by weight to the solid matter of the polymer dispersion, which process comprises:

(a) adding the polymer dispersion, the glass fiber, and water to the powder produced by reforming the glassy blast furnace slag powder;
(b) kneading;
(c) further adding the cationic polymer coagulant;
(d) forming the light weight formed body by press dehydration; and
(e) drying.

15. The process of claim 14, wherein the glassy blast furnace slag powder is obtained by grinding raw slag and collecting fine powder portions by classification.

16. The process of claim 15 wherein the glassy blast furnace slag powder is dehydrated by heating at 250 to 800° C. prior to adding the polymer dispersion, the glass fiber and the water.

17. A process for producing a light weight formed body having a bulk specific gravity of 0.2 to 1 g/cm$^3$ and which can be cut, scraped, and nailed which light weight formed body comprises a (i) powder having a BET surface area of 100-140 m$^2$/g produced by reforming a glassy blast furnace slag powder with an alkali aqueous solution through a dissolution reaction and a hydration reaction of glass or comprises a (ii) powder having a BET surface area of 100-140 m$^2$/g produced by reforming a glassy blast furnace slag powder with an alkali aqueous solution through a dissolution reaction and a hydration reaction of glass and then dehydrating with heating, and comprises at least one member selected from the group consisting of: (i) a calcium silicate hydrate in a blending ratio by weight of the powder produced by reforming the glassy blast furnace slag powder to the calcium silicate hydrate of 7:3 to 3:7, (ii) 10 to 150% of hydraulic gypsum as ratio by weight to the powder produced by reforming the glassy blast furnace slag powder, (iii) not more than 60% of a light weight aggregate as ratio by weight to the powder produced by reforming the glassy blast furnace slag powder, (iv) a thickener, (v) a dispersing agent, and (vi) a pigment, which process comprises:

(a) adding a polymer dispersion, 3 to 20% of a synthetic pulp as ratio by weight to the powder produced by reforming the glassy blast furnace slag powder, the at least one member selected from the group consisting of (i) to (vi) and water to the powder produced by reforming the glassy blast furnace slag powder;

(b) kneading;

(c) further adding a cationic polymer coagulant;

(d) forming the light weight formed body by press dehydration; and (e) drying.

18. The process of claim 17, wherein the glassy blast furnace slag powder is obtained by grinding raw slag and collecting fine powder portions by classification.

19. The process of claim 18 wherein the glassy blast furnace slag powder is dehydrated by heating at 250° to 800° C. prior to adding the polymer dispersion, the synthetic pulp and the water.

20. The process for producing a light weight formed body having a bulk specific gravity of 0.2 to 1 g/cm$^3$ and which can be cut, scraped, and nailed, which light weight formed body consists essentially of a (i) powder having a BET surface area of 100-140 m$^2$/g produced by reforming a glassy blast furnace slag powder with an alkali aqueous solution through a dissolution reaction and a hydration reaction of glass or a (ii) powder having a BET surface area of 100-140 m$^2$/g produced by reforming a glassy blast furnace slag powder with an alkali aqueous solution through a dissolution reaction and a hydration reaction of glass and then dehydrating with heating, in combination with 3 to 20% of a polymer dispersion as ratio by weight of solid matter to the powder produced by reforming the glassy blast furnace slag powder, 2 to 10% of glass fiber as ratio by weight to the powder produced by reforming the glassy blast furnace slag powder and 0.05 to 0.2 part of a cationic polymer coagulant by weight per 1 part by weight to the solid matter of the polymer dispersion, which process comprises:

(a) adding the polymer dispersion, the glass fiber, and water to the powder produced by reforming the glassy blast furnace slag powder;

(b) kneading;

(c) further adding the cationic polymer coagulant;

(d) forming the light weight formed body by press dehydration; and (e) drying.

21. The process of claim 20, wherein the glassy blast furnace slag powder is obtained by grinding raw slag and collecting fine powder portions by classification.

22. The process of claim 21 wherein the glassy blast furnace slag powder is dehydrated by heating at 250° to 800° C. prior to adding the polymer dispersion, the glass fiber and the water.

* * * * *